US007120356B2

(12) United States Patent
Graves et al.

(10) Patent No.: US 7,120,356 B2
(45) Date of Patent: Oct. 10, 2006

(54) CONNECTION VERIFICATION FOR OPTICAL SWITCHES

(75) Inventors: Alan F. Graves, Kanata (CA); Andrew J. Bryant, Bishops Stortford (GB); Andre J. Van Schyndel, Kanata (CA); John G. Gruber, Orleans (CA)

(73) Assignee: Nortel Networks Limited, St. Laurent (CA)

( * ) Notice: Subject to any disclaimer, the term of this patent is extended or adjusted under 35 U.S.C. 154(b) by 987 days.

(21) Appl. No.: 09/735,537

(22) Filed: Dec. 14, 2000

(65) Prior Publication Data

US 2002/0114035 A1      Aug. 22, 2002

(51) Int. Cl.
*H04B 10/08*      (2006.01)
(52) U.S. Cl. .............................. 398/9; 398/16; 398/33
(58) Field of Classification Search ................. 398/25, 398/34, 45, 48, 49, 50, 51, 55, 56, 12, 9, 398/19, 7, 16, 33
See application file for complete search history.

(56) References Cited

U.S. PATENT DOCUMENTS 5,963,312 A    10/1999  Roberts ..................... 356/73.1
6,005,695 A    12/1999  Roberts ..................... 359/110
6,246,668 B1*  6/2001  Kusyk ........................ 370/228
6,600,581 B1*  7/2003  Fatehi et al. ................... 398/9

* cited by examiner

*Primary Examiner*—David Payne
(74) *Attorney, Agent, or Firm*—Withrow & Terranova, PLLC

(57) ABSTRACT

A connection verification system that provides substantially non-intrusive connection verification for an optical switch, achieved by correlating the low-frequency contents of the input and switched signals. The results of the correlation process are compared against a connection map to determine whether the switch has operated correctly and to identify, if possible, which mis-connections have taken place. The system includes a selection unit for controllably admitting individual ones of the input signals and individual ones of the switched signals and a verification unit connected to the selection unit, for controlling operation of the selection unit as a function of a connection map and performing relative-delay-dependent signal processing operations on the signals admitted by the selection unit so as to identify connections established through the switching unit and determine their consistency with the connection map. The relative-delay-dependent signal processing operations may be based on correlation or anti-correlation, depending on the operational requirements of the invention.

51 Claims, 23 Drawing Sheets

CONNECTION VERIFICATION FOR OPTICAL SWITCHES

FIELD OF THE INVENTION

The present invention relates generally to optical switches and, more particularly, to systems for verifying connections through such switches.

BACKGROUND OF THE INVENTION

As the density of emerging high-capacity WDM systems increases, so too does the probability with which errors can be made when switching individual optical signals. Examples of what may cause an erroneous or lost connection include stuck or failed switch elements in the switching core of an optical switch, hardware or software failures causing incorrect switch path instructions to be received by the switching core from a switch controller, and human error (e.g., a mis-connected fiber interconnect into or between bays of switching equipment).

Given the high line rates currently used in WDM networks and the even higher line rates contemplated for use in the foreseeable future, it is clear that erroneous or lost connections can and will have a very severe negative impact on quality of service by causing the loss of large amounts of information. It is therefore of prime importance to check not only whether connections established by the switching core correspond to the connections specified by the connection map stored in the switch controller, but also to check which mis-connections may have taken place.

At the same time, it is important to make the connection verification process as generic and non-intrusive as possible so that constraints are not placed on the traffic bit rates and protocols, so that the effect that the connection verification procedure has on the quality and strength of the optical signals leaving the switch is limited and so that traffic security is not compromised. Moreover, it would be of interest if the connection verification system were to permit the use of simple, low-cost electronics and electro-optics for the verification function in order to limit the cost and component count of the additional hardware and software required to verify the connections. However, these requirements have yet to be met by existing connection verification techniques.

SUMMARY OF THE INVENTION

The present invention provides substantially non-intrusive connection verification for an optical switch, achieved by correlating the low-frequency contents of the input and switched signals. The results of the correlation process are compared against a connection map to determine whether the switch has operated correctly and to identify, if possible, which mis-connections have taken place.

Accordingly, the invention may be summarized according to a first broad aspect as a system for verifying connections established through a switching unit adapted to receive a plurality of input signals and output a plurality of switched signals. The system includes a selection unit for controllably admitting individual ones of the input signals and individual ones of the switched signals and a verification unit connected to the selection unit, for controlling operation of the selection unit as a function of a connection map and performing relative-delay-dependent signal processing operations on the signals admitted by the selection unit so as to identify connections established through the switching unit and determine their consistency with the connection map.

The invention may be summarized according to a second broad aspect as a method of validating connections established through a switching unit adapted to receive a plurality of input signals and output a plurality of switched signals. The method includes selecting one of the input signals; on the basis of a connection map, identifying a particular one of the switched signals as expected to be correlated with the selected input signal; determining a level of correlation or anti-correlation between the selected input signal and the switched signal expected to be correlated with the selected input signal; and if the level of correlation is significant or the level of anti-correlation is insignificant, concluding that the connection involving the selected input signal is consistent with the connection map.

The invention may also be broadly summarized as computer-readable media tangibly embodying a program of instructions executable by a computer to perform the above method. The invention may also be broadly summarized as at least one computer programmed to execute the above method.

According to another broad aspect, the invention may be summarized as a switch for optical signals, including a switching core for switching a plurality of input optical signals as a function of a connection map and outputting a plurality of switched optical signals and a connection verification system connected to the switching core, for correlating the input optical signals with the switched optical signals so as to determine the consistency of the connections established through the switching core with the connection map.

The invention may be summarized according to yet another broad aspect as a system for correlating a first sample stream with a second sample stream, including a first delay line for receiving the first sample stream, comprising a plurality of taps interspersed by delay elements, a second delay line for receiving the second sample stream, comprising a plurality of taps interspersed by delay elements, a plurality of anti-correlators, each having a first input connected to a tap in the first delay line and a second input connected to a tap in the second delay line, each anti-correlator being adapted to produce an anti-correlation value at a distinct relative delay, and a minimum detector connected to the anti-correlators, for selecting the least among the anti-correlation values produced by the anti-correlators and providing the result to a controller.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings, in which.

DETAILED DESCRIPTION OF THE PREFERRED EMBODIMENTS

As will be described in further detail herein below, the connection verification system of the present invention correlates the low-frequency content of a set of input single-carrier optical signals with the low-frequency content of a set of switched single-carrier optical signals. For best performance of the connection verification system, the low-frequency content (representing the first, say, 10–100 MHz of signal spectrum, depending on the design) of the various input signals arriving at the switch should be sufficiently unique and/or randomized so that the cross-correlation of the low-frequency content of any pair of distinct input signals is relatively weak compared to each signal's auto-correlation. This condition is met for most forms of scrambled binary information transmission including those commonly in use with existing fiber systems, such as SONET, SDH, PDH, Gigabit Ethernet, 10GE, as well as direct IP-over-wavelength, and wavelength-wrapper-encapsulated signals.

Other examples of signals suitable for use with the present invention include signals having a low-frequency component that is encoded using Walsh codes or other spread spectrum techniques. Suitable signals further include those designed in accordance with U.S. patent application Ser. No. 09/648,767 to Graves et al., filed on Aug. 28, 2000, entitled "Method, System and Signal for Carrying Overhead Information in a Transport Network Employing Photonic Switching Nodes", assigned to the assignee of the present invention and hereby incorporated by reference herein. The signals described in U.S. patent application Ser. No. 09/648,767 have a controllable low-frequency content (which can be made unique for each fiber and wavelength combination), while retaining enough high-frequency content to allow synchronization of downstream network elements to be maintained.

Figure 1:
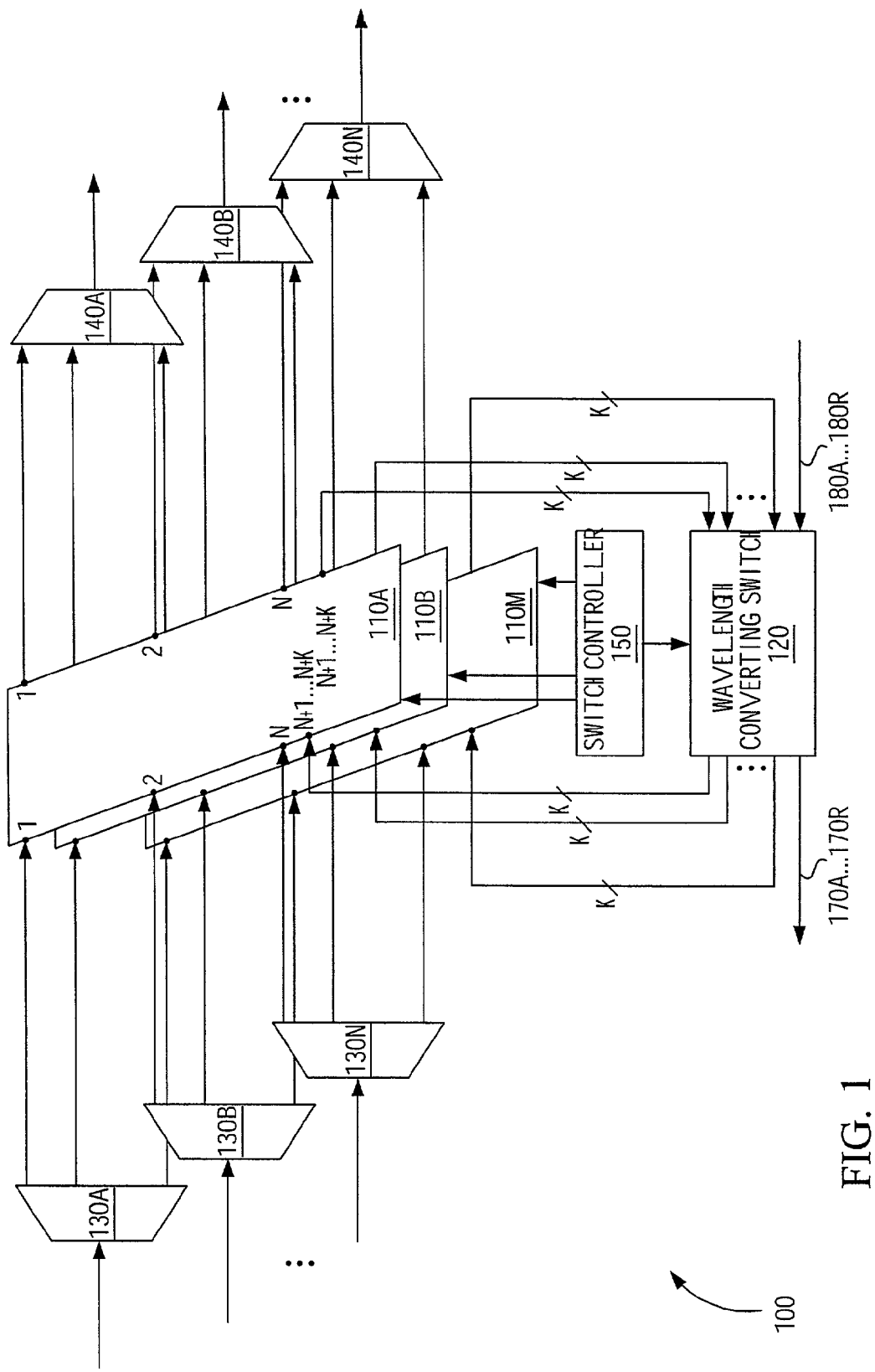
FIG. 1 is a block diagram of a WDM photonic switch.

Also, while the connection verification system of the present invention is applicable to virtually any type of switch, it is particularly suitable for use with a "photonic" switch. A "photonic" switch is a switch for optical signals (i.e., an optical switch) where the bulk of the traffic paths through the switch node are entirely implemented in the optical domain, i.e., without the need for converting optical signals into the electrical domain. An example of a photonic switch is shown in FIG. 1 and is described in greater detail in U.S. patent application Ser. No. 09/511,065 to Graves et al., filed on Feb. 23, 2000, entitled "Switch for Optical Signals", assigned to the assignee of the present invention and hereby incorporated by reference herein.

The functionality of a photonic switch is to switch or interchange individual single-wavelength modulated optical carriers within a series of input multi-carrier WDM feeds and to re-multiplex the resultant new combinations of single-carrier optical signals into new multi-carrier WDM feeds, having first wavelength-shifted any single-carrier optical signals that needed this function in order to permit onward propagation through the network. As such, a photonic switch is optimized for use in WDM line systems.

Specifically, and with reference to FIG. 1, a photonic switch 100 comprises a switching core which, in one embodiment, includes a plurality of optical switch matrices 110A . . . 110M (one for each of M optical wavelengths in the system), as well as a wavelength converting switch 120. The switching core provides controllable switching of single-carrier optical signals received from a plurality of wavelength division demultiplexing (WDD) devices 130A . . . 130N, which demultiplex the incoming multi-carrier WDM feeds into individual single-carrier optical signals. Switched single-carrier optical signals emerge from the switching core and are provided to a plurality of wavelength division multiplexing (WDM) devices 140A . . . 140N, which regroup the switched single-carrier optical signals into multi-carrier WDM feeds for onward propagation to the next network node.

Each of the optical switch matrices 110A . . . 110M has a total of N+K input ports and N+K output ports. For a given one of the optical switch matrices 110A . . . 110M, each of N input ports is connected to the like-wavelength output port of a respective one of the WDD devices 130A . . . 130N, while the remaining K input ports are connected to output ports of the wavelength converting switch 120. In an analogous fashion, each of N of output ports of each optical switch matrix is connected to the like-wavelength input port of a respective one of the WDM devices 140A . . . 140N, while the remaining K output ports are connected to input ports of the wavelength converting switch 120.

Each of the optical switch matrices 110A . . . 110M can be a Micro-Electro-Mechanical System (MEMS) as described in an article entitled "Free-Space Micromachined Optical-Switching Technologies and Architectures" by Lih Y. Lin of AT&T Labs-Research, presented during OFC99 Session W14-1 on Feb. 24, 1999 and hereby incorporated by reference herein. As is described in the aforementioned article, a MEMS comprises a set of mirrors that are arranged in geometrical relationship with its input and output ports in such a way that incoming light from any input port can be diverted to any output port by moving an appropriate one of the mirrors.

For the photonic switch 100 of FIG. 1, the moving (e.g., raising and lowering) of mirrors in the optical switch matrices 110A . . . 110M could be performed under control of a switch controller 150. Specifically, the switch controller 150 can supply each of the optical switch matrices 110A . . . 110M with a connection map defining the desired switching behaviour of that optical switch matrix. With additional reference to FIG. 2, the connection map supplied to the $\lambda^{th}$ optical switch matrix 110$\lambda$ can take the form of an (N+K) x (N+K) matrix, which may be represented as follows:

```
  output→ 1  2  ... N-1  N   N+1 ... N+K
↓ input    ------------------------------
1         |                |             |
2         |     [A_λ]      |    [C_λ]    |
...       |                |             |
N-1       |                |             |
N         |                |             |
N+1       ------------------------------
...       |                |             |
N+K       |     [B_λ]      |    [NULL]   |
          |                |             |
          ------------------------------
``` where

[$A_\lambda$] is a sparse matrix defining the desired mapping between input ports 1 . . . N and output ports 1 . . . N, where a "1" in position (x,y) signifies that the optical signal arriving from WDD device 130x and occupying the $\lambda^{th}$ wavelength is to be switched directly to WDM device 140y without wavelength conversion;

[$B_\lambda$] is a sparse matrix defining the desired mapping between input ports N+1 . . . N+K and output ports 1 . . . N, where a "1" in position (x,y) signifies that the optical signal arriving from the $(x-N)^{th}$ output of the wavelength converting switch 120 (for the $\lambda^{th}$ wavelength) is to be switched to WDM device 140y; and

[$C_\lambda$] is a sparse matrix defining the desired mapping between input ports 1 . . . N and output ports N+1 . . . N+K, where a "1" in position (x,y) signifies that the optical signal arriving from WDD device 130x is to be switched to the $(y-N)^{th}$ input of the wavelength converting switch 120 (for the $\lambda^{th}$ wavelength).

Thus, there should be no more than a single "1" in any row or column of [$A_\lambda$], [$B_\lambda$] or [$C_\lambda$]. Furthermore, there should be no "1" in any row of [$A_\lambda$] where there is a "1" in that row of [$C_\lambda$] and there should also be no "1" in any column of [$A_\lambda$] where there is a "1" in that column of [$B_\lambda$].

For its part, the wavelength converting switch 120 receives K single-carrier optical signals from each of the M optical switch matrices 110A . . . 110M and outputs K single-carrier optical signals back to each of the M optical switch matrices 110A . . . 110M. The wavelength converting switch 120 may also accept a total of R "add carriers" on a respective plurality of optical add paths 180A . . . 180R and similarly may output a total of R "drop carriers" on a respective plurality of optical drop paths 170A . . . 170R. Of course, it is within the scope to have different numbers of add carriers and drop carriers.

The wavelength converting switch 120 is equipped with circuitry for converting the received single-carrier optical signals into electrical form, electrically switching the electrical signals and then modulating each switched electrical signal with an optical source. The optical source may be fixed or tuned to the wavelength associated with a specific optical switch matrix in the switching core. Wavelength conversion is particularly useful when an input wavelength is already in use along the fiber path leading to a specific destination WDM device or group of WDM devices 140A . . . 140N that lead to the required destination via ongoing output optical fibers.

Figure 2:
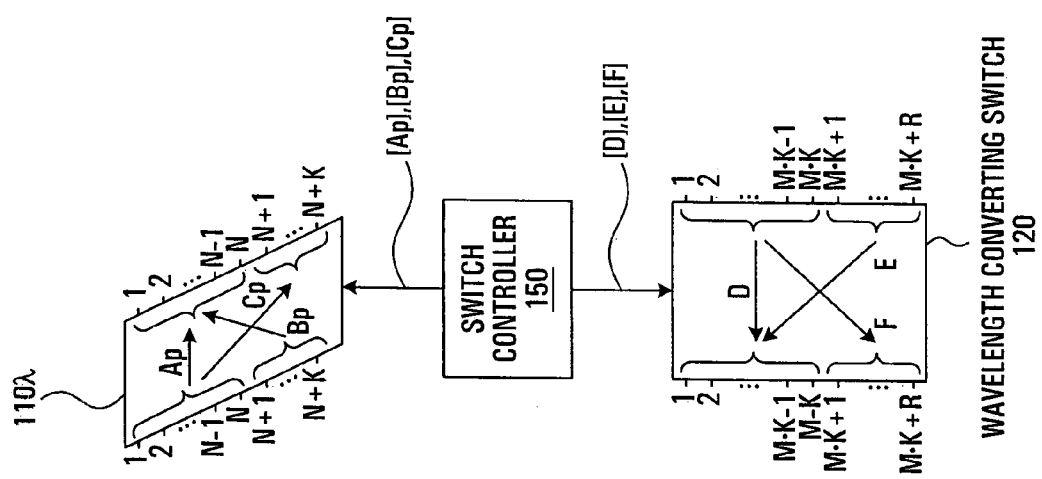
FIG. 2 illustrates mappings occurring within the photonic switch of FIG. 1.

The switching activity of the wavelength converting switch 120 is controlled by the switch controller 150 as a function of a connection map. With reference to FIG. 2, the connection map supplied to the wavelength converting switch 120 can take the form of an (M·K+R)×(M·K+R) matrix, which may be represented as follows:

```
  output→ 1  2  ... M·K  M·K  M·K ... M·K
↓ input              -1   +1       +R
                  ------------------------
1         |                |             |
2         |                |             |
...       |     [D]        |    [F]      |
M·K - 1   |                |             |
M·K       |                |             |
M·K + 1   |                |             |
...       ------------------------
M·K + R   |     [E]        |   [NULL]    |
          |                |             |
          ------------------------
``` where

[D] is a sparse M·K×M·K matrix defining the desired mapping between outputs N+1 to N+K of all M optical switch matrices 110A . . . 110M and inputs N+1 to N+K of all M optical switch matrices 110A . . . 110M;

[E] is a sparse R×M·K matrix defining the desired mapping between the R add carriers and inputs N+1 to N+K of all M optical switch matrices 110A . . . 110M; and

[F] is a sparse M·K×R matrix defining the desired mapping between outputs N+1 to N+K of all M optical switch matrices 110A . . . 110M and the R drop carriers.

From the above, it should be appreciated that the desired switching behaviour of the switching core will be an intricate function of mappings [$A_\lambda$], [$B_\lambda$], [$C_\lambda$], [D], [E] and [F] (where $\lambda \in \{A, \ldots, M\}$ for mappings [$A_\lambda$], [$B_\lambda$] and [$C_\lambda$]). However, in the event of a malfunction or mis-connection, the switching core might not exhibit the desired switching behaviour. With the aim of obtaining more information as to the source of a malfunction or mis-connection, connection verification operations can be performed on various mapping subsets.

Figure 3:
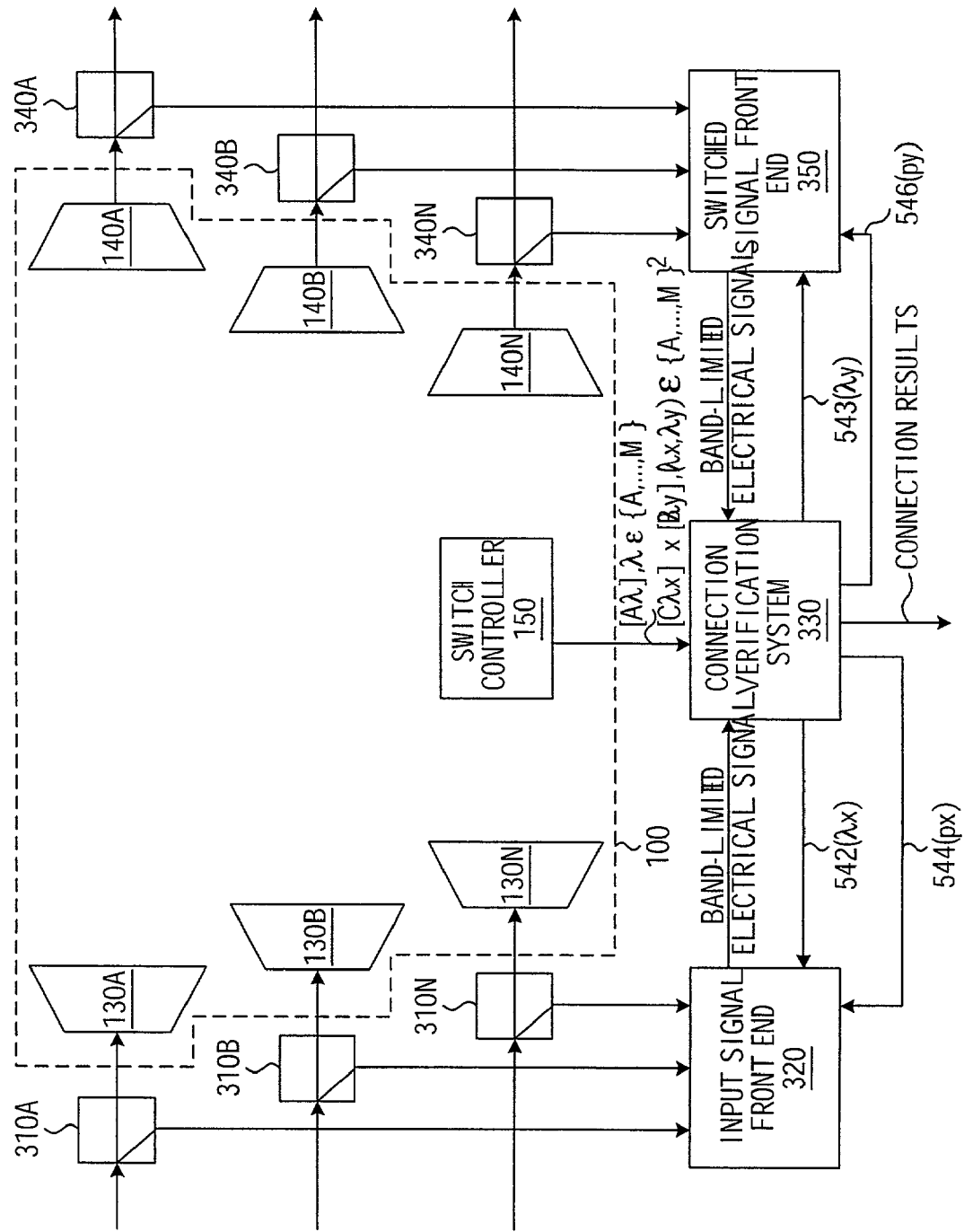
FIG. 3 is a block diagram of a subsystem used for the verification of a first subset of connections through the photonic switch of FIG. 1.

With reference to FIG. 3, there is shown a minimally intrusive subsystem for verifying whether each mapping in the following subset of mappings is being executed properly by the optical switch matrices 110A . . . 110M:

$\{[A_\lambda], \lambda \in \{A, \ldots, M\}\} \cup$
$\{[C_{\lambda x}] \times [B_{\lambda y}], (\lambda x, \lambda y) \in \{A, \ldots, M\}^2\}$.

The first part of the above subset of mappings covers signals entering and exiting the photonic switch at the same wavelength using the same optical switch matrix.

The second part of the above subset of mappings includes composite mappings which cover the case where signals undergo wavelength conversion. It will be noted, however, that if there is an error in the way a particular mapping (either [B*] or [C*]) is executed, connection verification performed using the subsystem of FIG. 3 will not allow precise identification of the culprit as either [B*] or [C*]

since it covers only composite mappings. To determine precisely which mapping is being erroneously executed requires that connection verification be performed using a different subsystem which is tailored towards verifying all mappings $[_{\lambda,y}]$ and $[C_{\lambda,x}]$ individually and such subsystems are described later on with reference to FIGS. 14 and 15, respectively.

Continuing with the description of the subsystem of FIG. 3, there is provided a first set of N optical splitters 310A . . . 310N, one in the optical path of each WDM signal entering a respective one of the WDD devices 130A . . . 130N in the photonic switch 100 of FIG. 1. Each of the N optical splitters 310A . . . 310N diverts a small fraction of the corresponding WDM signal towards a common input signal front end 320. The input signal front end 320 provides a band-limited electrical signal to an input signal side of a connection verification system 330.

Figure 4:
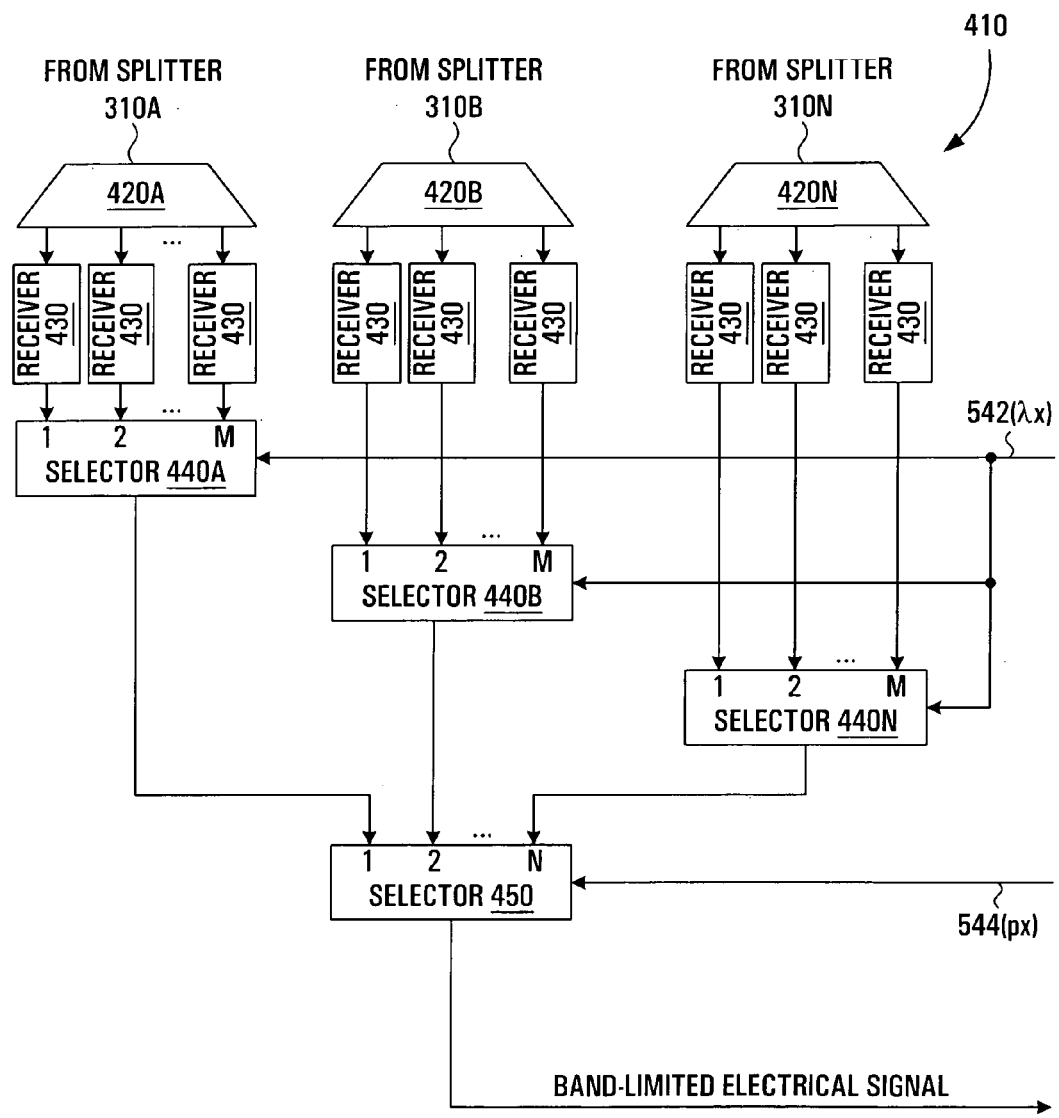
FIG. 4 is a block diagram of a front end for use in the subsystem of FIG. 3.

With additional reference to FIG. 4, there is shown a detailed block diagram of one of many embodiments of a front end 410 suitable for use with the present invention. The front end 410 could be the input signal front end 320 of FIG. 3. The front end 410 includes a set of N WDD devices 420A . . . 420N, each of which is connected to a respective one of the optical splitters 310A . . . 310N and has a respective set of M outputs, one for each of the M wavelengths in the system. Each output of each of the WDD devices 420A . . . 420N is supplied to a respective one of a plurality of receivers 430.

Each of the receivers 430 is operable to convert the corresponding incoming single-carrier optical signal into a band-limited electrical signal. This reduced-bandwidth signal will be used for correlation purposes in the connection verification system 330. Because of its reduced bandwidth, the signal received by the connection verification system 330 does not permit the recovery of a full-rate digital data stream and hence does not pose a security risk. Furthermore, since the optical receivers 430 only need exhibit enough bandwidth to pass the frequency spectral components required for the operation of 330, they can be of a relatively low, fixed bandwidth, independent of the traffic signal bandwidth.

Alternatively, each receiver 430 can have a wide electrical bandwidth, with the precise bandwidth of the signal to be fed to the connection verification system 330 being determined by one or more low-pass electrical filters (not shown) between the receivers 430 and the connection verification system 330. The electrical bandwidth of the receivers 430 (or of the receivers 430 plus the low-pass filters) thus sets a coarse upper bound on the bandwidth of the resulting signal that is used for correlation purposes within the connection verification system 330. A suitable electrical bandwidth for the receivers 430 will also allow for relatively inexpensive implementation of the front end 410. An example of a suitable electrical bandwidth for the receivers 430 is 100 MHz, although other higher and lower bandwidths can be used, depending on the operational requirements of the invention.

The front end 410 also comprises a set of N first M-way selectors 440A . . . 440N, each of which receives the output of M respective receivers 430. Specifically, the set of first selectors 440A . . . 440N is arranged so that first selector 440n receives those M electrical signals that correspond to the M optical signals provided by WDD device 420n for n∈{A, . . . , N}. Operation of the first set of selectors 440A . . . 440N is jointly controlled via a select line 542, which effectively selects the wavelength (denoted λx). The output of each of the N first selectors 440A . . . 440N is provided to a respective input of a single second selector 450. Operation of the second selector 450 is controlled via another select line 544, which effectively selects the port (denoted px) of the input optical switch matrix at the selected wavelength (λx).

Thus, the output of the second selector 450 is a band-limited electrical signal provided to the connection verification system 330. This band-limited electrical signal is the one appearing at input port px of optical switch matrix 110λx. It should be appreciated that control of the first selectors 440A . . . 440N results in selection of the wavelength λx, while control of the second selector 450 results in selection of px, corresponding to the port or, equivalently, to the WDD device 420A . . . 420N. Both free scanning and directed control of sequencing λx and px can be exerted.

Continuing with the description of the subsystem in FIG. 3, there is provided a second set of N optical splitters 340A . . . 340N, one in the optical path of each switched WDM signal exiting a respective one of the WDM devices 140A . . . 140N. Each of the N optical splitters 340A . . . 340N diverts a small fraction of the corresponding switched WDM signal towards a common switched signal front end 350. The switched signal front end 350 could be identical to the front end 410 of FIG. 4, except that select lines 542 (specifying λx) and 544 (specifying port px or WDD device 130px) would be replaced by select lines 543 (specifying wavelength λy) and 544 (specifying port py or WDM device 140py).

Thus, the switched signal front end 350 provides a band-limited electrical signal to a switched signal side of the connection verification system 330. This band-limited electrical signal is the one appearing at output port py of optical switch matrix 110λy.

Thus, it is seen that the connection verification system 330 receives a band-limited input signal from the input signal front end 320 (controlled by λx and px) and also receives a band-limited switched signal from the switched signal front end 350 (controlled by λy and py). The connection verification system 330 receives the set of mappings $[A\lambda]$, $[B_\lambda]$ and $[C_\lambda]$ (λ∈{A, . . . , M}) from the switch controller 150.

Through precise control of px, py, λx and λy, a controller within the connection verification system attempts to determine whether the subset of mappings defined by:

$\{[A_\lambda], \lambda\epsilon\{A, \ldots, M\}\}U$
$\{[C_{\lambda,x}]\times[B_{\lambda,y}], (\lambda x,\lambda y)\epsilon\{A, \ldots, M\}^2\}$ has been accurately executed by the optical switch matrices 110A . . . 110M. This will be described in greater detail in the course of a description of an example connection verification system.

Figure 5:
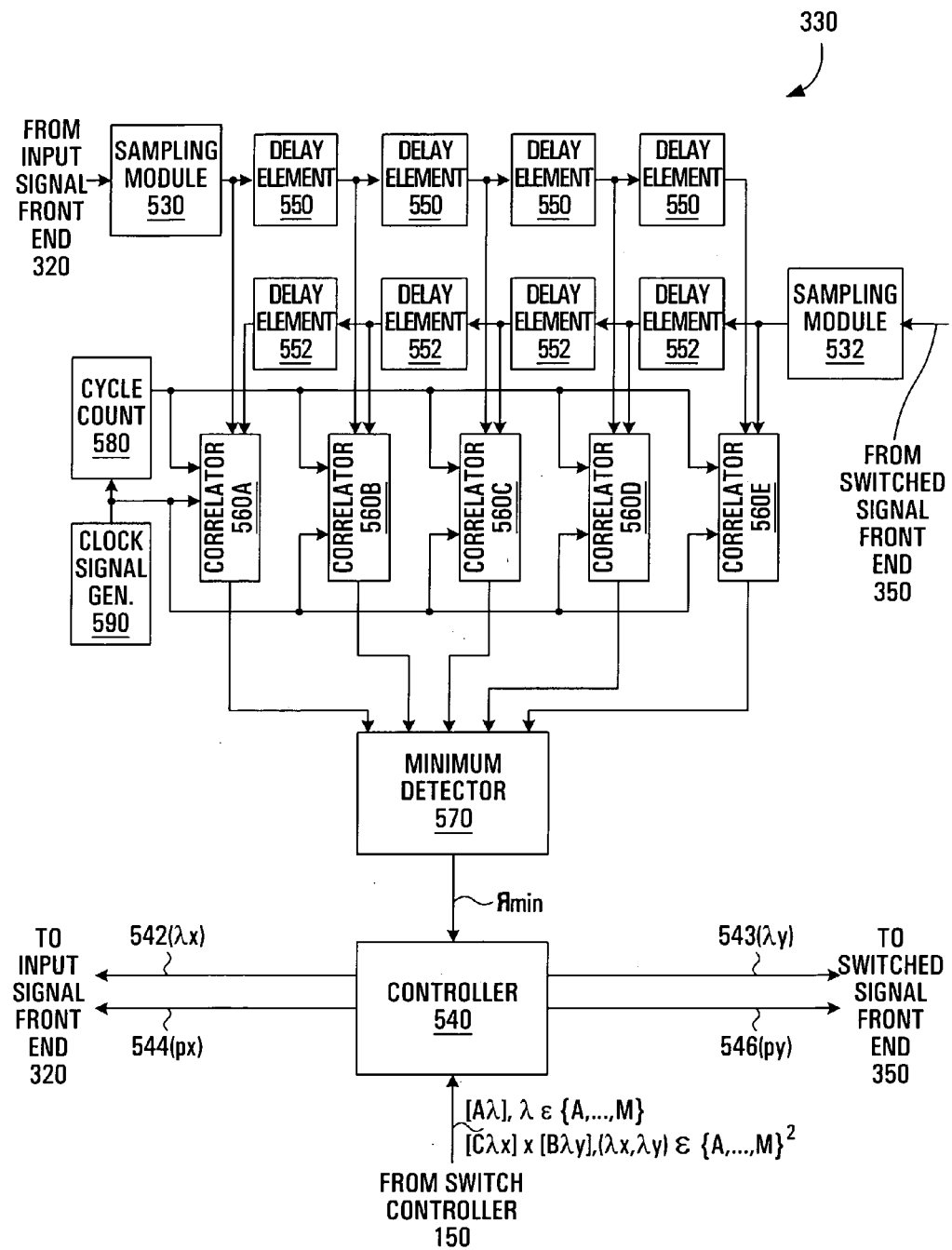
FIG. 5 is a block diagram of a connection verification system for use in the subsystem of FIG. 3.

Accordingly, reference is now made to FIG. 5, wherein is shown a functional block diagram of a connection verification system 330 in accordance with an embodiment of the present invention. The connection verification system 330 comprises an input signal sampling module 530, which accepts the band-limited electrical signal consisting of the low frequency components of the time-varying frequency content of the digital bit stream under test from the input signal front end 320. The output of the sampling module 530 is an input signal sample stream, which is provided to a first in a series of delay elements 550 forming an input signal tapped delay line. The delay elements 550 may be implemented as shift registers, for example.

In one embodiment of the connection verification system 330, the sampling module 530 may include a precision anti-alias filter and an analog-to-digital converter (ADC).

Since the anti-alias filter will establish the frequency spectrum that will be digitized and used in the correlator, the sampling rate of the ADC and the bandwidth of the anti-alias filter should be selected such that the Nyquist criterion is satisfied. An anti-alias filter is not required if the electrical bandwidth of the receivers 430 in the input signal front end 320 is less than half of the sampling rate of the ADC in the sampling module 530. If such a filter is omitted, then the requirement for maintaining the same filtered bandwidth for the input and switched signals moves to the receivers 430.

The connection verification system 330 of FIG. 5 also comprises a switched signal sampling module 532. The switched signal sampling module 532 may be identical to the input signal sampling module 530 and as such may include a precision anti-alias filter and an ADC. The output of the switched signal sampling module 532 is a switched signal sample stream that is provided to a first in a series of delay elements 552 forming a switched signal tapped delay line.

The purpose of the two tapped delay lines containing delay elements 550, 552 is to allow a series of parallel correlations to be performed with different time "skew" between the input samples and the output samples. This is to allow the different potential delays through the switch node to be taken into account during the correlation process. For example, for a propagation distance of 20 meters through the switch at about 200,000 km/sec (the approximate speed of light in glass), the delay which would need to be accommodated is approximately equal 100 nanoseconds.

Continuing with the description of FIG. 5, different pairs of samples, one from each of the two sample streams, are fed to respective ones of a plurality of differential correlators 560A . . . 560E. This causes a distinct relative delay to exist between each different pair of samples fed to each of the differential correlators 560A . . . 560E.

Specifically, differential correlator 560A is fed an undelayed sample from the input signal tapped delay line and a four times delayed sample from the switched signal tapped delay line (for a relative delay of −4), differential correlator 560B is fed a once delayed sample from the input signal tapped delay line and a thrice delayed sample from the switched signal tapped delay line (for a relative delay of−2), differential correlator 560C is fed a twice delayed sample from the input signal tapped delay line and a twice delayed sample from the switched signal tapped delay line (for a relative delay of 0), differential correlator 560D is fed a thrice delayed sample from the input signal tapped delay line and a once delayed sample from the switched signal tapped delay line (for a relative delay of +2) and differential correlator 560E is fed a four times delayed sample from the input signal tapped delay line and an undelayed sample from the switched signal tapped delay line (for a relative delay of +4).

It will be understood by those of ordinary skill in the art that in a unidirectional switch (one with "inputs" and "outputs"), only one set of delay elements may be required (e.g., the set of delay elements 550), since the input will typically always precede the output. However, both sets of delay elements will be required in the case of long optical paths from the optical splitters 310A . . . 310N to the connection verification system 330 and also in the case where the photonic switch 100 is worked in a bidirectional fashion (in which case the inputs and outputs become interchangeable).

It should also be appreciated that although only four delay elements are shown in each of the tapped delay lines of FIG. 5, the actual number of delay elements 550 and 552 and the individual delay provided by each such delay element should be chosen as a function of the operational requirements of the invention. Thus, a wide variation in the individual delay of each delay element and in the total delay of each tapped delay line is within the scope of the present invention.

Nonetheless, the chances of obtaining a meaningful result are improved when the total delay of each tapped delay line is at least as long as the maximum lag through the switch (which is usually on the order of less than 100 nanoseconds but may be more).

Furthermore, since the cross-correlation of two signals is sensitive to the relative delay between them, it is preferable to ensure that the change in the relative delay, from one differential correlator to the next, is kept to within a predetermined upper bound.

For instance, it has been found that meaningful results can be obtained when the change in the relative delay between pairs of signals fed to adjacent differential correlators is less than about 15–30 degrees at the signals' highest frequency component. This is because the accuracy of the correlation process degrades significantly beyond a phase error of about 15–30 degrees between the signal components being correlated. For signals with a bandwidth of 15 MHz each, this corresponds to a requirement that the relative delay vary by less than 10 ns from one differential correlator to the next. In the connection verification system of FIG. 5, where the delay "resolution" is twice the delay produced by a delay element (in this case either −4, −2, 0, +2 or +4), each delay element would be required to provide a delay of at most 5 ns.

Figure 7:
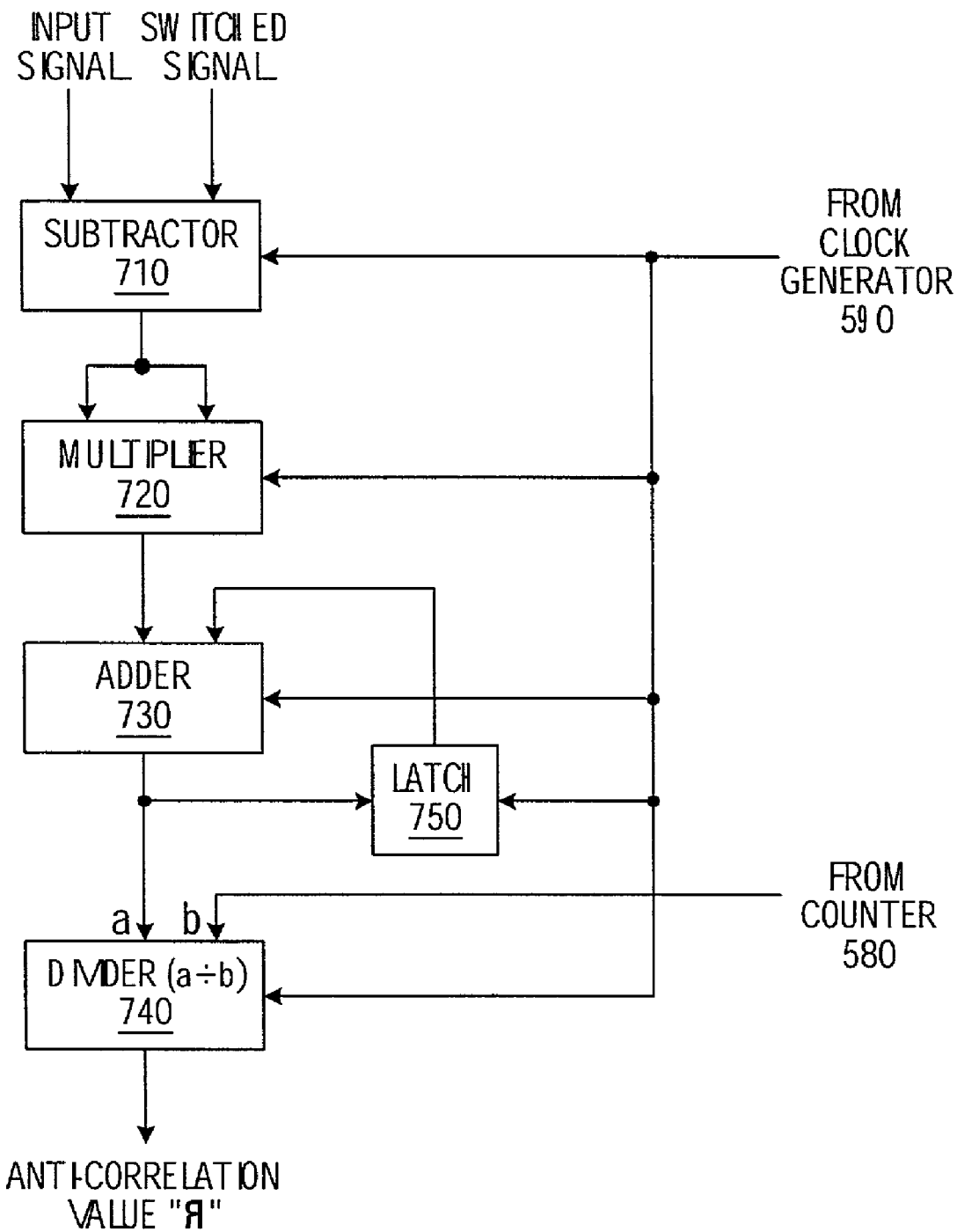
FIG. 7 is a block functional diagram of a differential correlator in the connection verification system of FIG. 5.

One possible implementation of a differential correlator is now described with additional reference to FIG. 7, wherein it is seen that the differential correlator accepts samples of an input signal from the input signal tapped delay line and samples of a switched signal from the switched signal tapped delay line. The differential correlator is also seen to accept a clock signal from a common external clock signal generator 590, as well as a counter signal from a common external clock cycle counter 580. The clock cycle counter 580 provides a running total of the clock cycles generated by the clock signal generator 590.

Samples of the input signal and the switched signal enter a subtractor 710, which may be of standard design and which is clocked by the clock signal received from the clock signal generator 590. The subtractor 710 computes the difference between the input and switched signal samples and provides the result to both inputs of a multiplier 720. Note that, for two perfectly correlated signals, the output of the subtractor 710 would be zero, but for imperfectly or non-correlated samples the output would be non-zero, i.e., of either positive or negative polarity.

The multiplier 720, also clocked by the clock signal from the clock signal generator 590, computes the product of the samples at its two inputs. In this case, the product corresponds to the square of the sample at the output of the subtractor 710, which is a measure of how far apart are the two inputs to the subtracter 710. The output from 720 will always be positive for a case of a difference between the two inputs of the subtracter 710 irrespective of the polarity of that difference, but will be zero when those inputs are the same. The product generated at the output of the multiplier 720 is supplied to a first input of an adder 730.

The adder 730 has a second input as well as an output. Connected between its output and its second input is a latch 750. Both the adder 730 and the latch 750 are clocked by the clock signal from the clock signal generator 590. In a customary manner, the adder 730 adds the samples at its two inputs. Since the sum is fed back to its second input via the latch 750, the adder 730 in fact behaves as an accumulator. In addition to being provided to its second input via the latch 750, the output of the adder 730 is provided to a first input ("a") of a divider 740, which also has a second input ("b") as well as an output. The second input ("b") of the divider 740 is the output of the cycle counter 580. The divider 740 is clocked by the clock signal from the clock signal generator 590 and is operable to divide the output of the adder 730 by the output of the counter 580.

Those skilled in the art will therefore appreciate that a differential correlator such as the one just described with reference to FIG. 7 evaluates the following function:

$E[(x(i-s)-y(i))^2]$, where y(i) is generally either equal to x(i–s) for some value of "s" (when the two signals are truly correlated) or is totally uncorrelated with x(i) (when the two signals are truly uncorrelated). Consequently, $\Re$ can be viewed as a normalized version of the "anti-correlation" existing between the input signal sample stream and the switched signal sample stream.

It has been found that such "anti-correlation" as computed by the differential correlators 560 leads to particularly robust results in the presence of certain kinds of noise and other system parametric errors or tolerance. As an example, common mode noise disappears from the calculation of the correlation value. As a second example, a 5% amplitude mismatch between the two inputs into the connection verification system 330 results in a 0.25% error component at the output of the multiplier 720.

Returning to the description of the connection verification system 330 in FIG. 5, the output of the divider in each of the differential correlators 560A ... 560E is provided to a minimum detector 570. The minimum detector 570 is adapted to locate the minimum value of "$\Re$" by finding the minimum among the outputs of the differential correlators 560. This minimum anti-correlation value, denoted "$\Re_{min}$" corresponds to the minimum anti-correlation value for the current input signal and the current values of px, py, λx and λy.

Although the above anti-correlation function has been found to give robust results under certain circumstances, it is within the scope of the invention to use other anti-correlation functions, depending on the operational requirements of the connection verification system 330. Of course, it is also within the scope of the invention to use a correlation function (instead of an anti-correlation function) and to consequently replace the minimum detector 570 with a maximum detector.

Assuming that an anti-correlation system is used, the minimum detector 570 supplies a controller 540 with the minimum anti-correlation value "$\Re_{min}$" for the current input signal (px) at the current input wavelength (λx) and for the current switched signal (py) at the current switched wavelength (λy). The controller 540 uses the value of $\Re_{min}$ for different values of px, py, λx and λy to perform connection verification for the subset of mappings:

$\{[A_\lambda], \lambda \in \{A, \ldots, M\}\} \cup$
$\{[C_{\lambda x}] \times [B_{\lambda y}], (\lambda x, \lambda y) \in \{A, \ldots, M\}^2\}$ which the connection verification system controller 540 receives from the switch controller 150. The connection verification system controller 540 and the switch controller 150 thus communicate, e.g., for directed connectivity verification during switching and to download anticipated cross-connection maps against which the controller 540 can evaluate its measurements.

The controller 540 is adapted to exert control over px, py, λx and λy in the following way. Control of the wavelength λx of the input signal is achieved by a select signal provided along select line 542 connected to the first selectors in the input signal front end 320, while control of the switch matrix port px of the input signal is achieved by a select signal provided along select line 544 connected to the second selector in the input signal front end 320. Control of the wavelength λy of the switched signal is achieved by a select signal provided along select line 543 connected to the first selectors in the switched signal front end 350, while control of the switch matrix port py of the switched signal is achieved by a select signal provided along select line 546 connected to the second selector in the switched signal front end 350.

Figure 6A:
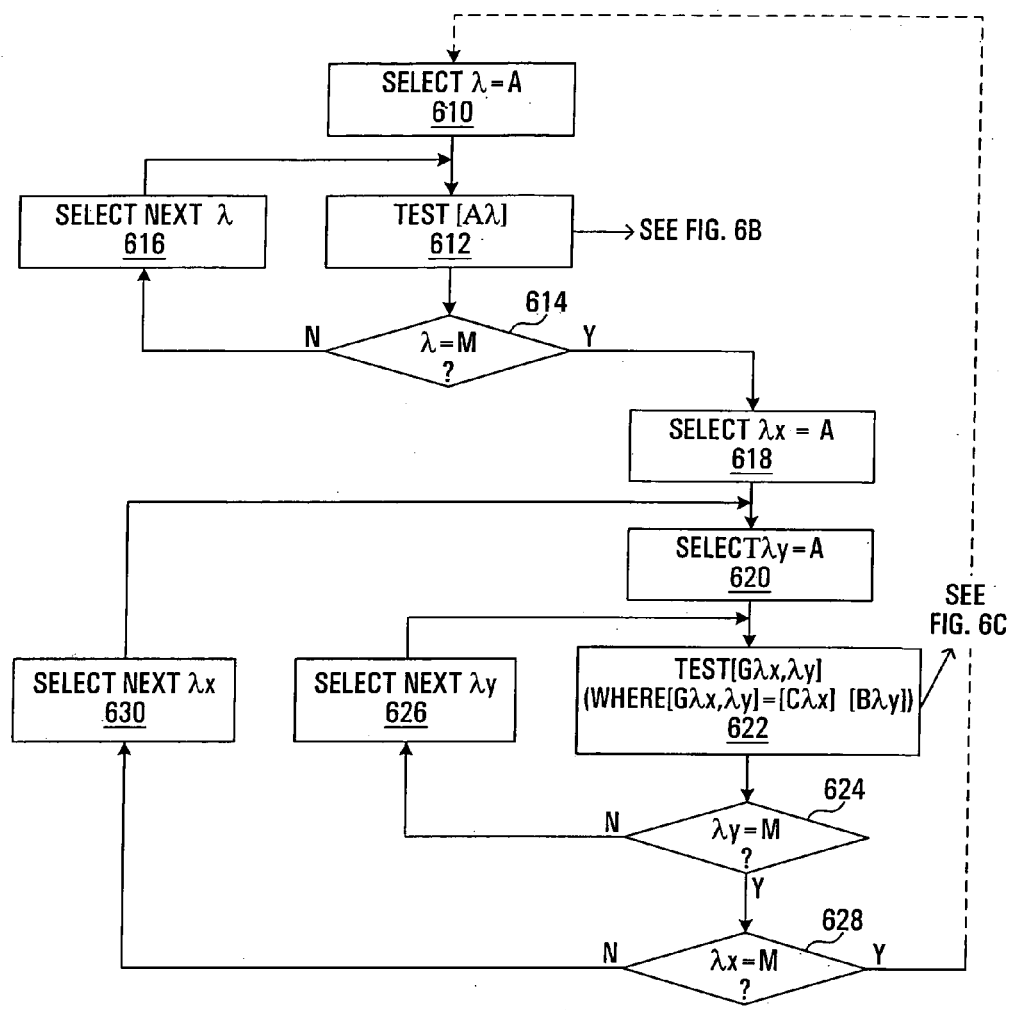
FIGS. 6A–6C are flowcharts illustrating operational steps in a connection verification algorithm executed by a controller in the connection verification system of FIG. 5.

In operation, the controller 540 executes a connection verification algorithm, an example of which is now described in greater detail with reference to the flowchart of FIG. 6A, and with continued reference to the subsystem block diagram of FIG. 3.

| | |
|---|---|
| 610: | The controller 540 selects λx = λy = λ = A. This value is jointly sent to both front ends 320, 350 along select line 542 and select line 543. The controller 540 proceeds to STEP 612. |
| 612: | The controller 540 tests mapping [$A_\lambda$] for the current value of p (which, in a first instance, will be equal to A). The testing of mapping [$A_\lambda$] will be described herein below in greater detail with reference to FIG. 6B. The controller 540 proceeds to STEP 614. |
| 614: | The controller 540 checks to see whether λ = M. If λ ≠ M, the controller 540 proceeds to STEP 616; however, if λ = M, the controller proceeds to STEP 618. |
| 616: | The controller 540 sets λ to the next value in the set {A, ..., M} and returns to STEP 612, where the mapping [$A_\lambda$] will be tested for this next value of p. |
| 618: | All mappings [$A_\lambda$] have now been tested and it is time for the controller 540 to test each of the mappings [$C_{\lambda x}$] × [$B_{\lambda y}$] for (λx, λy) ∈ {A, ..., M}². For notational convenience, the composite mapping [$C_{\lambda x}$] × [$B_{\lambda y}$] will hereinafter be denoted [$G_{\lambda x, \lambda y}$]. At this point, λx is initialized to A and the controller 540 proceeds to STEP 620. |
| 620: | Here, λy is also initialized to A, which sets the stage for testing the mapping [$G_{A, A}$] = [$C_A$] × [$B_A$] in a first instance. The controller then proceeds to STEP 622. |
| 622: | The controller tests mapping [$G_{\lambda x, \lambda y}$] = [Cλx] × [Bλy] for the current values of λx and λy (which, in a first instance, are both equal to A). The testing of mapping [$G_{\lambda x, \lambda y}$] will be described herein below in greater detail with reference to FIG. 6C. After testing [$G_{\lambda x, \lambda y}$] the controller 540 proceeds to STEP 624. |
| 624: | The controller 540 checks to see whether λy = M. If λy ≠ M, the controller 540 proceeds to STEP 626; however, if λy is equal to M, the controller proceeds to STEP 628. |
| 626: | The controller 540 sets λy to the next value in the set {A, ..., M} and returns to STEP 622, where the mapping [$G_{\lambda x, \lambda y}$] will be tested for this next value of λy while retaining the same value of λx. |
| 628: | The controller 540 checks to see whether λx = M. If λx ≠ M, the controller 540 proceeds to STEP 630; however, if λx is equal to M, the controller 540 has verified all mappings [$G_{\lambda x, \lambda y}$] and therefore returns to the beginning of the connection verification algorithm at STEP 610. |

-continued

| | |
|---|---|
| 630: | The controller 540 sets λx to the next value in the set {A, . . . , M} and returns to STEP 620, where the mapping [G$_{λx, λy}$] will be tested for this next value of λx and for all values of λy. |

The above algorithm shows, at a high level, how connection verification is effected for all mappings in the set $\{[A_λ], λ \in \{A, \ldots, M\}\} \cup$
$\{[G_{λx, λy}]=[C_{λx}] \times [B_{λy}], (λx,λy) \in \{A, \ldots, M\}^2\}$.

Figure 6B:
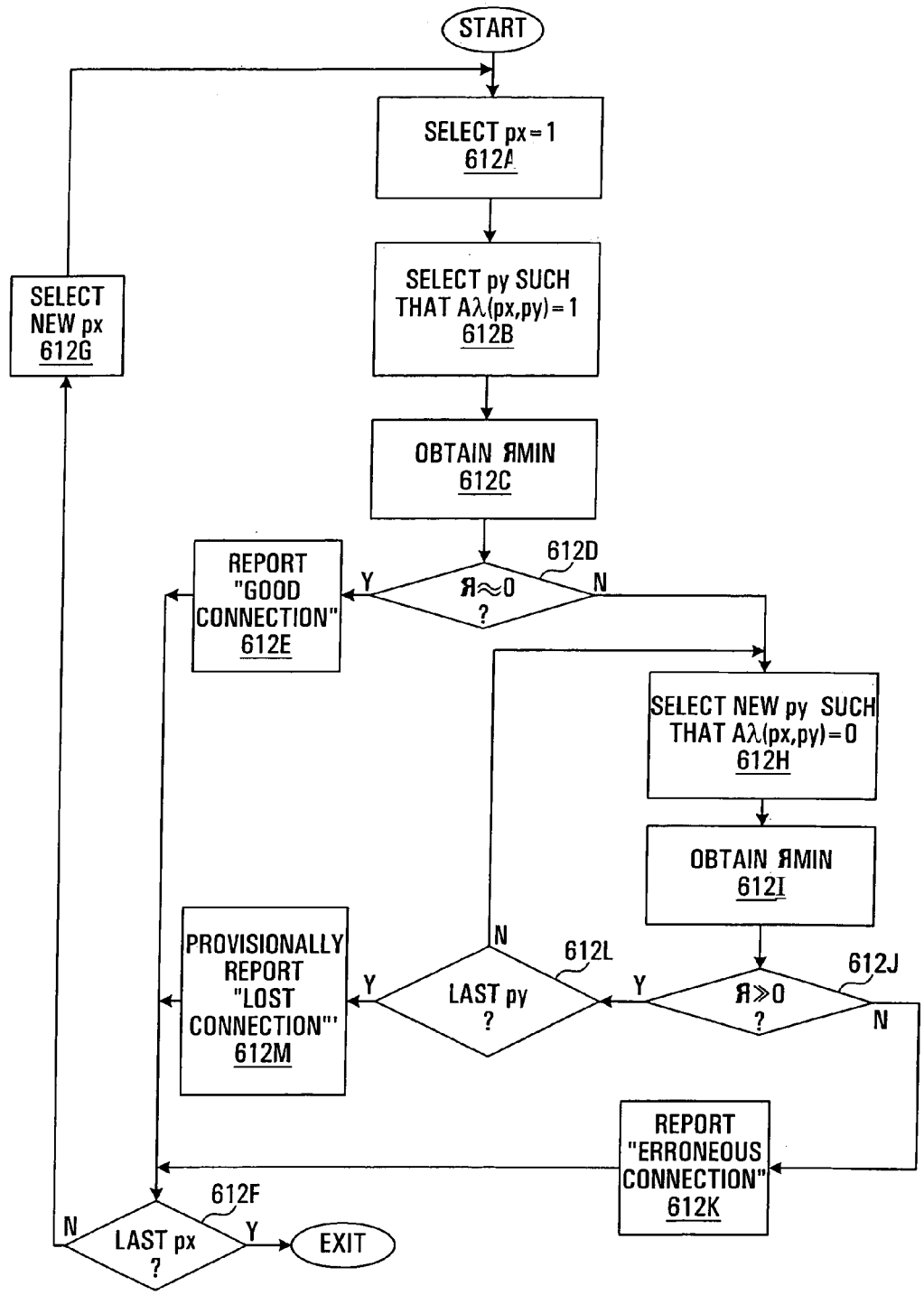

Details regarding the testing of a particular mapping [A$_λ$] are now described with reference to steps 612A–612L in FIG. 6B and details regarding the testing of a particular mapping [G$_{λx,λy}$] are now described with reference to steps 622A–622H in FIG. 6C.

| | |
|---|---|
| 612A: | The controller 540 selects px to be equal to 1. This value is provided to the input signal front end along select line 544, which effectively results in selection of the input signal arriving at input port 1 of switch matrix 110λ. The controller 540 proceeds to STEP 612B. |
| 612B: | For the chosen value of px, the controller 540 selects py such that A$_λ$(px, py) = 1. In other words, the controller 540 sends a control signal to the switched signal front end 350 along select line 546, where py is chosen such that the switched signal passed by the switched signal front end 350 is the one switched signal that is expected to be a delayed version of the input signal currently being passed by the input signal front end 320. The controller 540 proceeds to STEP 612C. |
| 612C: | The controller 540 reads the minimum anti-correlation value "ℜ$_{min}$" from the minimum detector 570 and proceeds to STEP 612D. |
| 612D: | The controller 540 determines whether ℜ$_{min}$ is close to zero, as would be expected since the switched signal was chosen to be a delayed version of the input signal. If ℜ$_{min}$ ≈ 0, the controller 540 proceeds to STEP 612E. However, if ℜ$_{min}$ is not close to zero, then there is a problem with the connection and the controller 540 proceeds to STEP 612H. |
| 612E: | Since ℜ$_{min}$ ≈ 0, it is concluded that the connection involving input signal px and switched signal y for the current values of px and py is valid. This condition can be reported to an external module and the controller 540 subsequently proceeds to STEP 612F. |
| 612F: | The controller 540 verifies whether px = N, i.e., whether all input signals have been verified for the current wavelength (the current value of λ). If so, the controller 540 exits STEP 612 altogether and the connection verification algorithm proceeds to STEP 614 (see FIG. 6A) . Otherwise, if px ≠ N, then the controller 540 moves to STEP 612G. |
| 612G: | The controller 540 increments px, following which the controller 540 returns to STEP 612B, where connectivity for the next row in [A$_λ$] is verified. |
| 612H: | In order to try and determine where input signal px has been mis-connected (or whether the connection involving input signal px has been lost altogether), the controller 540 selects, in a deterministic scanning sequence, a different value of y with the constraint that A$_λ$(px, py) = 0. In other words, the controller 540 sends a control signal to the switched signal front end 350 along select line 546, causing the switched signal front end 350 to pass a switched signal py which is not expected to be a delayed version of input signal px currently being passed by the input signal front end 320. The controller 540 proceeds to STEP 612I. |
| 612I: | The controller 540 reads the minimum anti-correlation value "ℜ$_{min}$" from the minimum detector 570 and proceeds to STEP 612J. |
| 612J: | Although it is expected that ℜ$_{min}$ will not be close to zero (i.e., ℜ$_{min}$ >> 0), it may happen that ℜ$_{min}$ ≈ 0, for example when a mis-connection has taken place. Accordingly, the controller 540 determines whether ℜ$_{min}$ is not close to zero. If ℜ$_{min}$ is not close to zero, there is no mis-connection for the current values of px and py and the controller 540 proceeds to STEP 612L. However, if ℜ$_{min}$ is close to zero, then correlation has been detected for input signal x and switched signal y and the controller 540 proceeds to STEP 612K. |
| 612K: | Here, the controller 540 concludes that a mis-connection has taken place and may report this conclusion to an external module. The controller 540 subsequently proceeds to STEP 612F, previously described. However, before proceeding to STEP 612F, the controller 540 may "camp" on this combination of px and py for a little while longer in order to ascertain, with greater confidence, that a mis-connection has occurred between input signal px and switched signal py for the current values of px and py. |
| 612L: | The controller 540 checks to see if an attempt has been made to correlate all switched signals (values of py) with input signal px. If not, then a mis-connection is still possible and the controller returns to STEP 612H. However, if there are no more values of py which would lead to A$_λ$(px, py) = 0 for the current value of px, then the controller proceeds to STEP 612M. |
| 612M: | As there are no more possibilities for detecting a mis-connection, the controller 540 provisionally concludes that the connection involving input signal px has been "lost". The provisional conclusion of a "lost" connection can be reported to an external module, after which the controller 540 proceeds to STEP 612F, previously described. It should be noted that the conclusion of a "lost" connection is provisional because a connection may appear to be "lost" although it may in fact be going by [C$_{λx}$] × [B$_λ$] (for λx ≠ λ) and not straight through [A$_λ$] and therefore further testing of composite mappings will have to be performed (see description of STEP 622 below). |

Figure 6C:
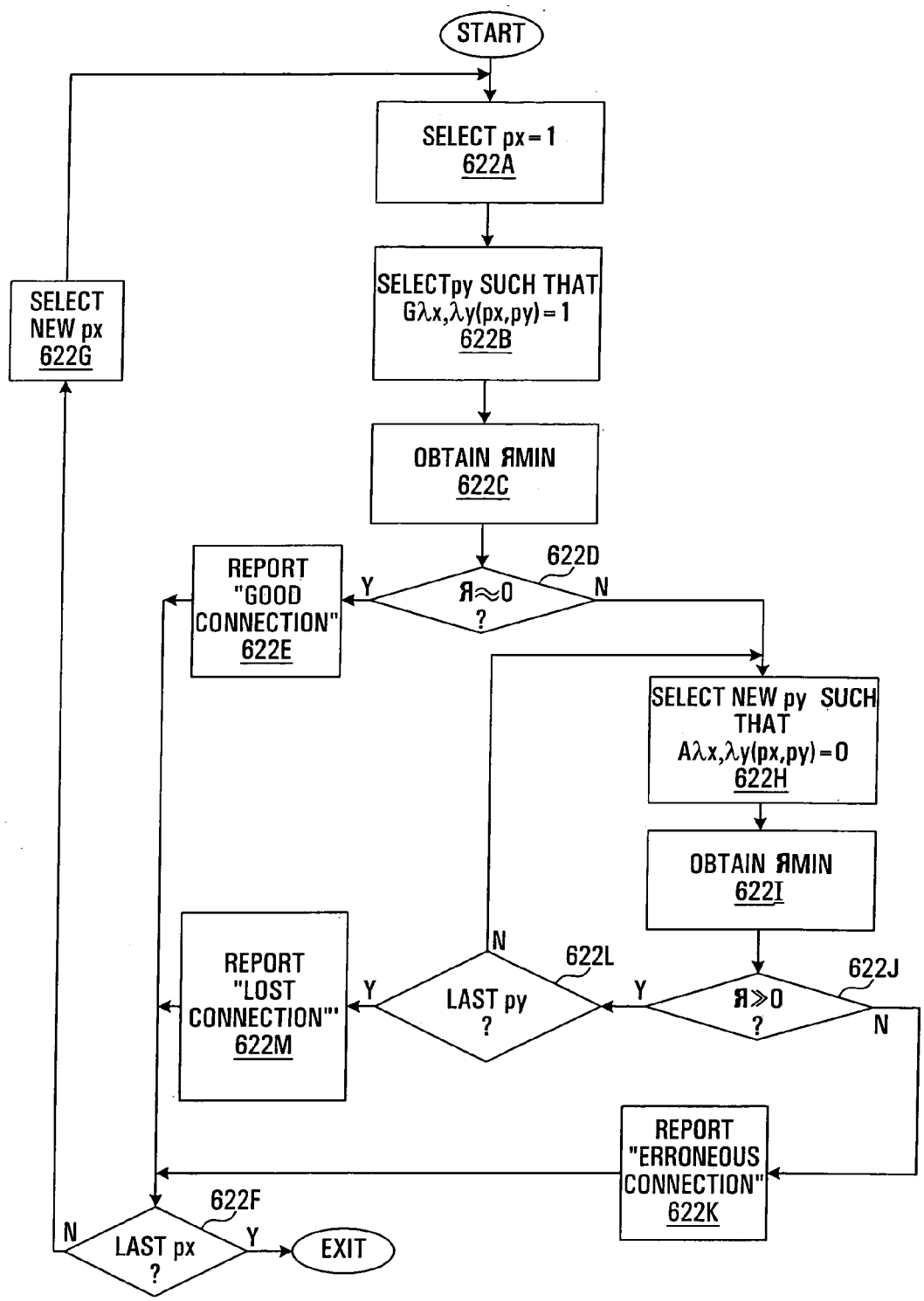

With reference now to FIG. 6C, the sub-steps of STEP 622 executed in association with the testing of a particular mapping [G$_{λx,λy}$]=[C$_{λx}$]×[B$_{λy}$] are now described.

| | |
|---|---|
| 622A: | The controller 540 selects px to be equal to 1. This value is provided to the input signal front end along select line 544, which effectively results in selection of the input signal arriving at input port 1 of switch matrix 110λx (where λx and λy were selected prior to entering STEP 622 to begin with - see FIG. 6A). The controller 540 proceeds to STEP 622B. |
| 622B: | For the chosen value of px, the controller 540 selects py such that G$_{λx,λy}$(px, py) = 1. In other words, the controller 540 sends a control signal to the switched signal front end 350 along select line 546, effectively resulting in selection of the switched signal at output port py of optical switch matrix 110λy. Here, py is chosen such that the switched signal passed by the switched signal front end 350 is the one switched signal that is expected to correspond to a delayed version of the input signal currently being passed by the input signal front end 320. The controller 540 proceeds to STEP 622C. |
| 622C: | The controller 540 reads the minimum anti-correlation value "ℜ$_{min}$" from the minimum detector |

| | -continued |
|---|---|
| | 570 and proceeds to STEP 622D. |
| 622D: | The controller 540 determines whether $\mathfrak{R}_{min}$ is close to zero, as would be expected since the switched signal was chosen to be a delayed version of the input signal. If $\mathfrak{R}_{min} \approx 0$, the controller 540 proceeds to STEP 622E. However, if $\mathfrak{R}_{min}$ is not close to zero, then there is a problem with the connection and the controller 540 proceeds to STEP 622H. |
| 622E: | Since $\mathfrak{R}_{min} \approx 0$, it is concluded that the connection involving input signal px and switched signal py for the current values of px and py is valid. This condition can be reported to an external module and the controller 540 subsequently proceeds to STEP 622F. |
| 622F: | The controller 540 verifies whether px = N, i.e., whether all input signals have been verified for the current values of λx and λy. If so, the controller 540 exits STEP 622 altogether and the connection verification algorithm proceeds to STEP 624 (see FIG. 6A). Otherwise, if px ≠ N, then the controller 540 moves to STEP 622G. |
| 622G: | The controller 540 increments px, following which the controller 540 returns to STEP 622B, where connectivity for the next row in [$G_{λx,λy}$] is verified. |
| 622H: | In order to try and determine where input signal px has been mis-connected (or whether the connection involving input signal px has been lost altogether), the controller 540 selects, in a deterministic scanning sequence, a different value of py with the constraint that $G_{λx,λy}$(x, y) = 0. In other words, the controller 540 sends a control signal to the switched signal front 350 end along select line 546, causing the switched signal front end 350 to pass a switched signal py which is not expected to be a delayed version of input signal px currently being passed by the input signal front end 320. The controller 540 proceeds to STEP 622I. |
| 622I: | The controller 540 reads the minimum anti-correlation value "$\mathfrak{R}_{min}$" from the minimum detector 570 and proceeds to STEP 622J. |
| 622J: | Although it is expected that $\mathfrak{R}_{min}$ will not be close to zero (i.e., $\mathfrak{R}_{min} >> 0$), it may happen that $\mathfrak{R}_{min} \approx 0$, for example when a mis-connection has taken place. Accordingly, the controller 540 determines whether $\mathfrak{R}_{min}$ is not close to zero. If $\mathfrak{R}_{min}$ is not close to zero, there is no mis-connection for the current values of px and py and the controller 540 proceeds to STEP 622L. However, if $\mathfrak{R}_{min}$ is close to zero, then correlation has been detected for input signal px and switched signal py and the controller 540 proceeds to STEP 622K. |
| 622K: | Here, the controller 540 concludes that a mis-connection has taken place and may report this conclusion to an external module. This conclusion may override a previously held conclusion of "lost connection", which may have been found at STEP 612M (see FIG. 6B). The controller 540 subsequently proceeds to STEP 622F, previously described. Before proceeding to STEP 622F, the controller 540 may "camp" on this combination of px and py for a little while longer in order to ascertain, with greater confidence, that a mis-connection has occurred between input signal px and switched signal py for the current values of px and py. |
| 622L: | The controller 540 checks to see if an attempt has been made to correlate all switched signals (values of py) with input signal px. If not, then a mis-connection is still possible and the controller returns to STEP 622H. However, if there are no more values of py which would lead to $A_λ$px, py) = 0 for the current value of px, then the controller proceeds to STEP 622M. |
| 622M: | As there are no more possibilities for detecting a mis-connection, the controller 540 definitively concludes that the connection involving input signal px has been "lost". This conclusion can be reported to an external module, after which the |

| | -continued |
|---|---|
| | controller 540 proceeds to STEP 622F, previously described. |

Once the integrity of each connection has been checked, the results can be analyzed to see whether there are any malfunctions or mis-connections, and, if so, whether such malfunctions or mis-connections are due to a particular optical switch matrix or a particular mirror on a particular optical switch matrix or a particular input or output port on a particular optical switch matrix, etc.

Thus, malfunctions and mis-connections which are caused by the straight-through mapping [$A_λ$] of a particular optical switch matrix 110λ will be "caught" using the above algorithm. Also, it will be possible to identify when a mapping [$G_{λx,λy}$] has failed, although isolation of the error to either [$C_{λx}$] or [$B_{λy}$] may require further investigation (see subsystems described later with reference to FIGS. 12 and 14).

Figure 18:
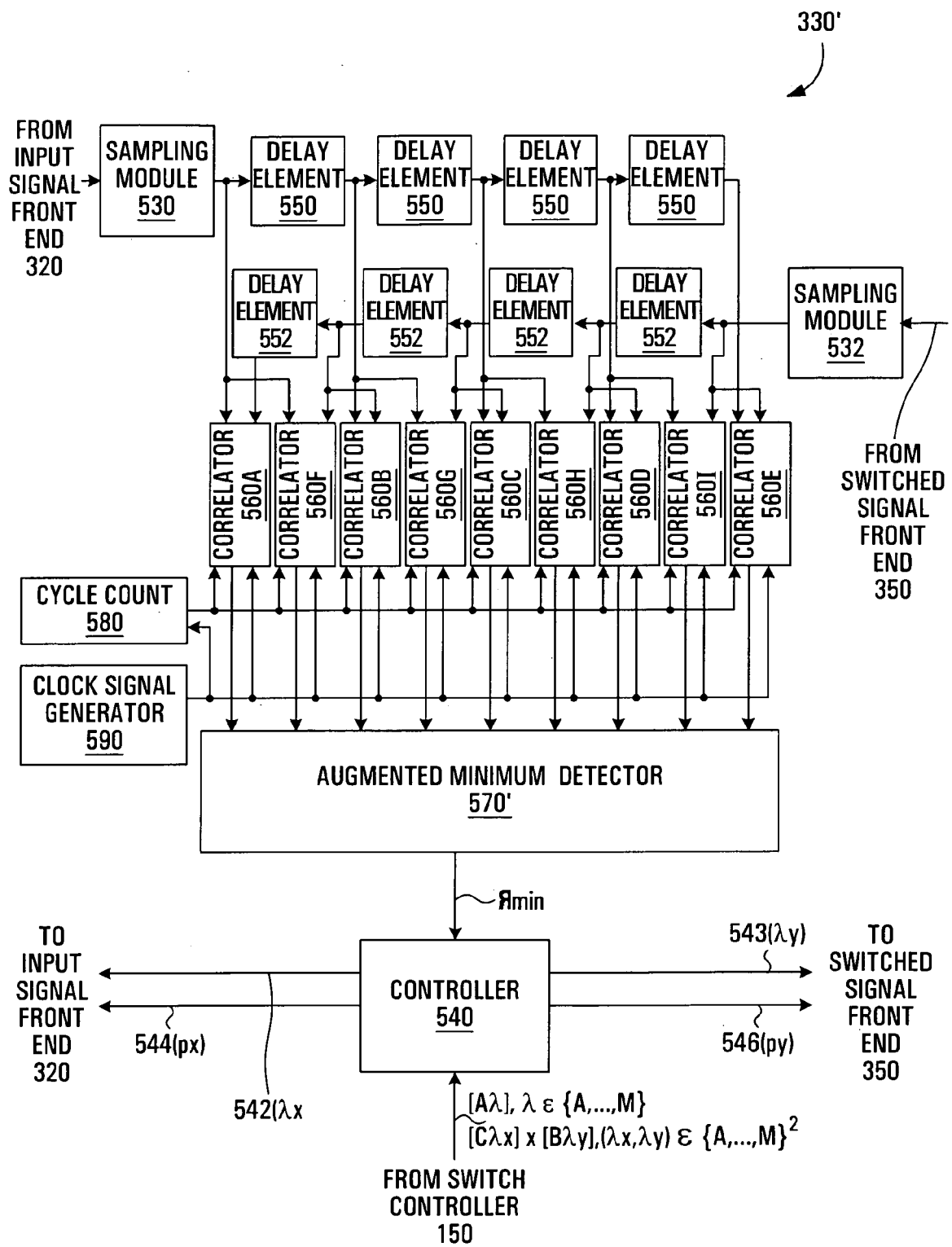
FIG. 18 is a block diagram of an alternative implementation of the connection verification system of FIG. 5.

Those skilled in the art should appreciate that other embodiments of the connection verification system 330 are possible. For example, FIG. 18 shows a connection verification system 330' wherein the delay "resolution" (i.e., the increment in the relative delay between adjacent differential correlators) is equal to the delay produced by one of the delay elements 550, 552. This delay resolution is twice as fine as the delay resolution of the connection verification 330 previously described with reference to FIG. 5. The finer resolution is obtained by supplementing the differential correlators 560A . . . 560E of FIG. 5 with additional differential correlators 560F, 560G and 560H and 560I.

Specifically, differential correlator 560F is fed an undelayed sample from the input signal tapped delay line and a three times delayed sample from the switched signal tapped delay line (for a relative delay of −3), differential correlator 560G is fed a once delayed sample from the input signal tapped delay line and a twice delayed sample from the switched signal tapped delay line (for a relative delay of −1), differential correlator 560H is fed a twice delayed sample from the input signal tapped delay line and a once sample from the switched signal tapped delay line (for a relative delay of +1) and differential correlator 560I is fed a three times delayed sample from the input signal tapped delay line and an undelayed sample from the switched signal tapped delay line (for a relative delay of +3). Thus, it is seen that all relative delays between −4 and +4 unit delays are "caught" by the bank of differential correlators 560A . . . 560I, the outputs of which are fed to an augmented minimum detector 570'.

Those skilled in the art should also appreciate that it is within the scope of the invention to provide a connection verification system in which parallel correlation operations are performed on multiple pairs of input and switched signals. Thus, multiple sets of λx and px and multiple sets of λy and py could be generated by the controller 540 at any one time.

It should further be appreciated that many variations of the front ends 320, 350 are within the scope of the present invention. For example, suitable variations of the front ends 320, 350 are described in provisional U.S. patent application Ser. No. 60/207,292 to Graves et al., entitled "Optical Switch with Connection Verification", filed May 30, 2000 and hereby incorporated by reference herein.

Figure 8:
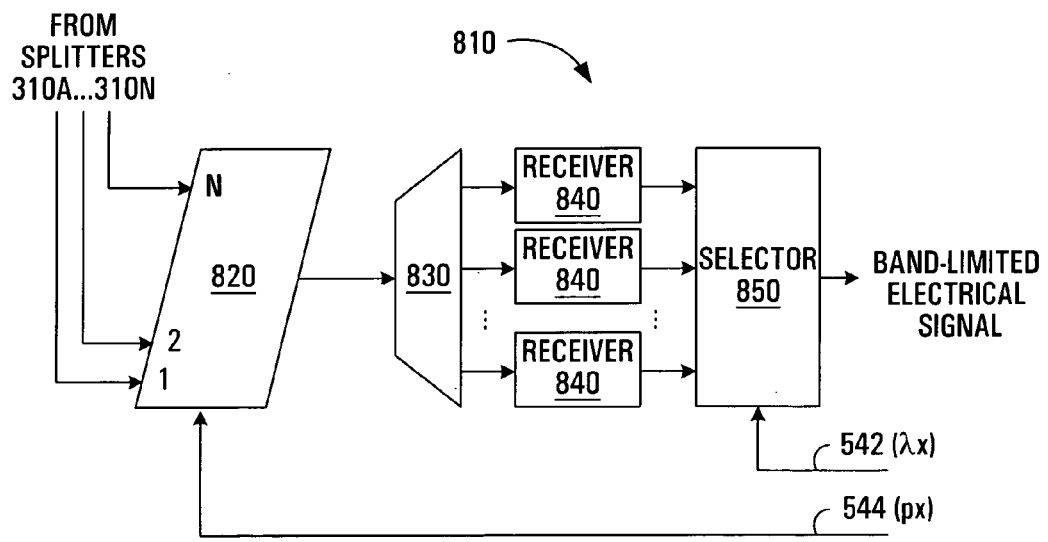
FIGS. 8–11 are block diagrams of various alternative implementations of the front end of FIG. 4.

Other suitable variations of the front ends 320, 350 are shown in FIGS. 8 through 11. With reference to FIG. 8, there is shown an alternative embodiment of a front end 810, comprising a MEMS-based optical switch or similar optical switch matrix 820 for receiving N WDM signals from the N splitters 310A . . . 310N. In response to the signal on select line 544, the optical switch matrix 820 selectably passes one of the received WDM signals through to a single output port. The output port of the optical switch matrix 820 is connected to a WDD device 830, which splits the selected WDM signal into its M wavelength components. Each of M output ports of the WDD device 830 carries a single-carrier optical signal which is fed to a respective one of a plurality of receivers 840. Each of the receivers 840 may have a wide optical bandwidth or it may be tuned to the specific wavelength of the single-carrier optical signal received from the WDD device 830. Each receiver operates to convert the incoming single-carrier optical signal from its specific associated WDD port into a band-limited electrical signal. The output of each receiver is fed to a respective input of a selector 850. Thus, the selector 850 receives M band-limited electrical signals, one for each wavelength in the system. In accordance with a select signal receiver along select line 542, the selector 850 controllably passes one of these M band-limited electrical signals to its output.

Figure 9:
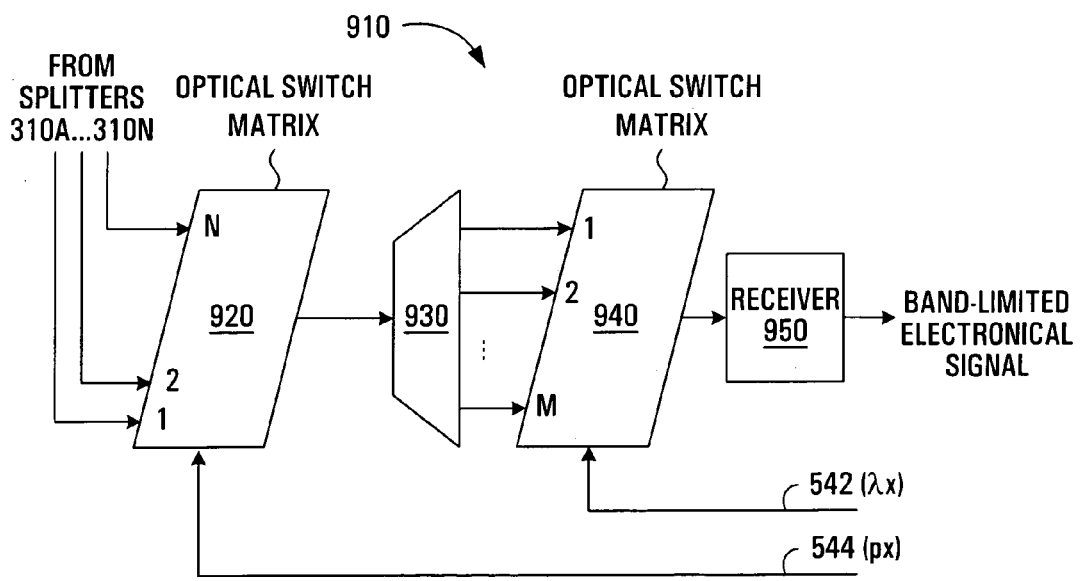

Another alternative embodiment of a front end is shown in FIG. 9, where the front end 910 comprises an optical switch matrix 920 for receiving N WDM signals from the N splitters 310A . . . 310N. In response to the signal on select line 544, the optical switch matrix 920 selectably passes one of the N received WDM signals through to a single output port. The output port of the optical switch matrix 920 is connected to a WDD device 930, which splits the selected WDM signal into its M wavelength components. Each of M output ports of the WDD device 930 carries a single-carrier optical signal which is fed to a respective input of another optical switch matrix 940. In response to the signal on select line 542, the optical switch matrix 940 selectably passes one of the M received single-carrier optical signals through to a single output port, which is connected to a receiver 950. The receiver 950 should have a wide optical bandwidth so that it is capable of accommodating a single-carrier optical signal on any one of the M wavelengths. The receiver 950 operates to convert the incoming single-carrier optical signal into a band-limited electrical signal which is fed to the connection verification system 330.

Figure 10:
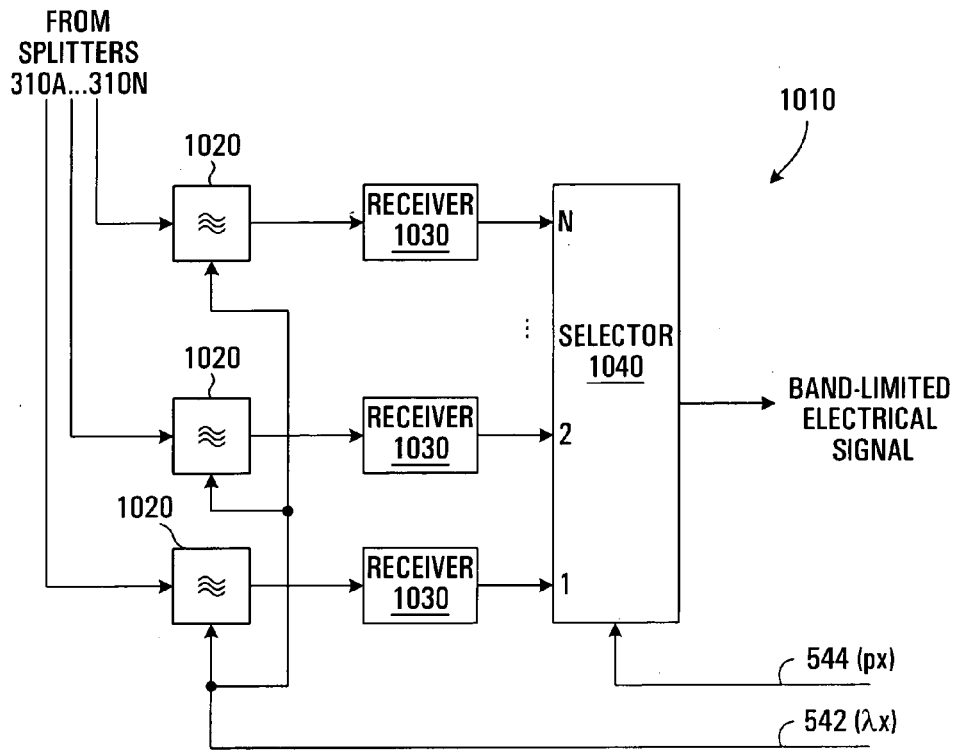

FIG. 10 shows yet another implementation of a front end 1010, in which the WDM signals received from the plurality of splitters 310A . . . 310N are fed to a respective plurality of tunable optical filters 1020. Each tunable optical filter 1020 can be of standard design and has a pass band that is controllable via select line 542. The output of each of the tunable optical filters 1020 is supplied to a respective one of a plurality of receivers 1030. The receivers 1030 should have a wide optical bandwidth so that they are capable of accommodating single-carrier optical signals on any of the M wavelengths in the system. The receivers 1030 operate to convert the incoming single-carrier optical signals into band-limited electrical signals which are fed to respective inputs of a selector 1040. The selector 1040 controllably passes one of these N band-limited electrical signals to its output, in accordance with a select signal received along select line 544.

Figure 11:
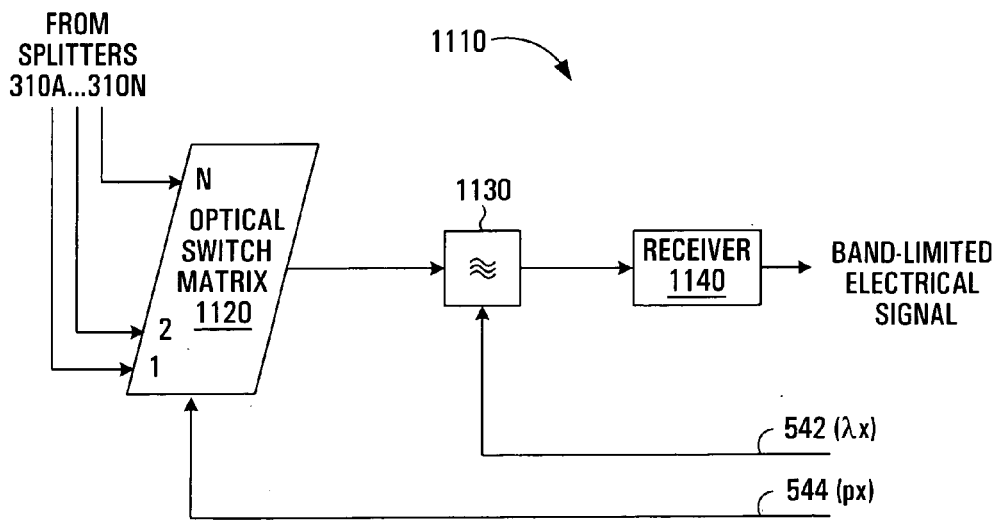

FIG. 11 shows still another implementation of a front end 1110. Here, an optical switch matrix 1120 is used to receive N WDM signals from the N splitters 310A . . . 310N. In response to the signal on select line 544, the optical switch matrix 1120 selectably passes one of the N received WDM signals through to a single output port. The output port of the optical switch matrix 1120 is connected to a tunable optical filter 1130, which has a pass band that is controllable via select line 542. The output of the tunable optical filter 1130 is connected to a receiver 1140, which should have a wide optical bandwidth so that it may accommodate a single-carrier optical signal on any of the M wavelengths in the system. The receiver 1140 operates to convert the incoming single-carrier optical signal into a band-limited electrical signal which is provided to the connection verification system 330.

Figure 14:
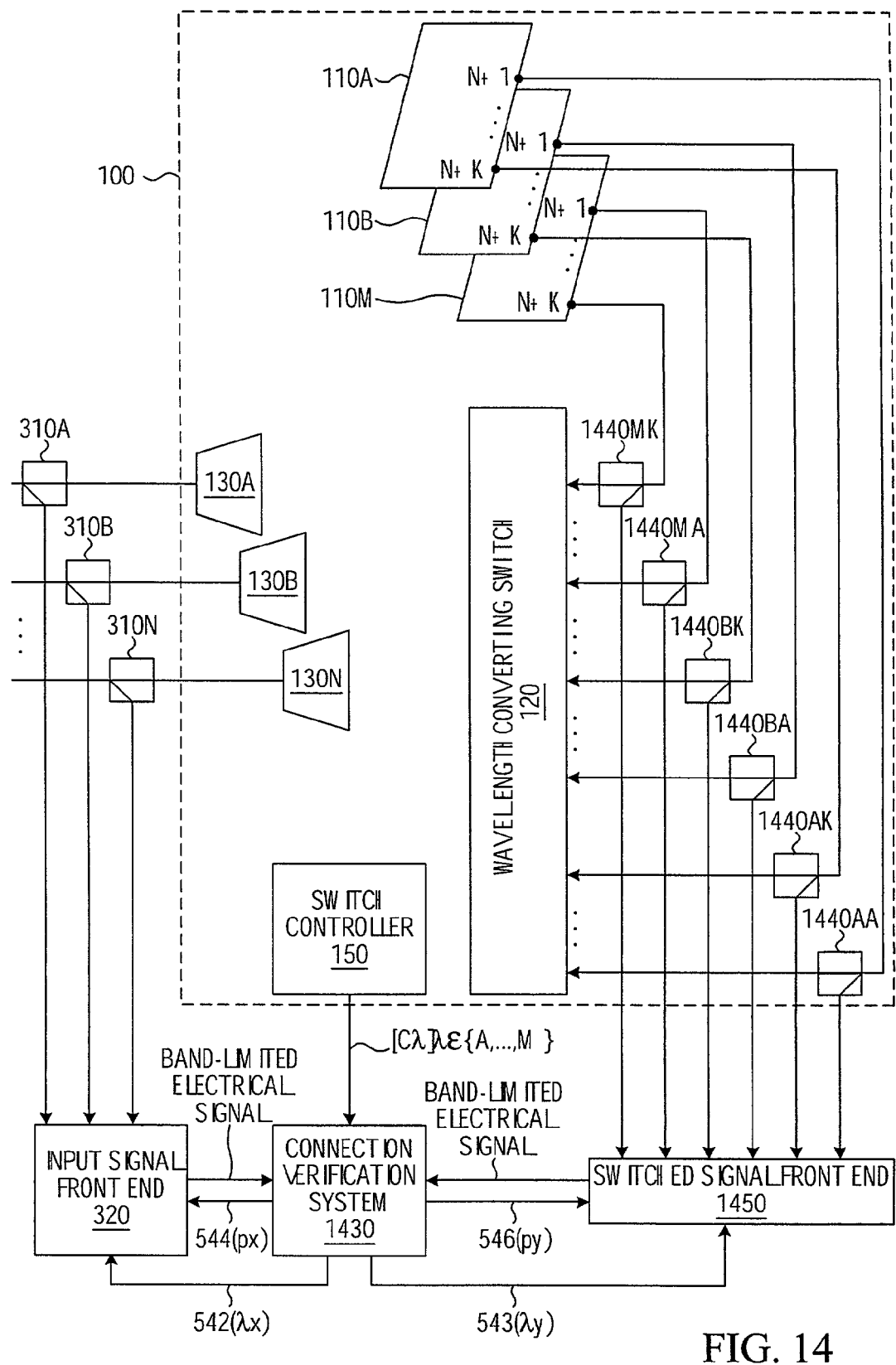
FIG. 14 is a block diagram of a subsystem used for the verification of a third subset of connections through the photonic switch of FIG. 1.

As alluded to herein above, the connection verification algorithm described in FIGS. 6A–6B may determine that an error has occurred in a mapping $[G_{\lambda x, \lambda y}]=[C_{\lambda x}]\times[B_{\lambda y}]$, although it is not possible, from that algorithm, to determine whether the error is in the execution of mapping $[C_{\lambda x}]$ or mapping $[B_{\lambda y}]$. Thus, further investigation is required. Accordingly, FIG. 12 shows a subsystem for verifying whether the mappings $[B_\lambda]$ are properly executed by optical switch matrices 110λ (for λ∈{A, . . . , M}) and FIG. 14 shows a subsystem for verifying whether the mappings $[C_\lambda]$ are being properly executed by optical switch matrices 110λ (for λ∈{A, . . . , M})

Figure 12:
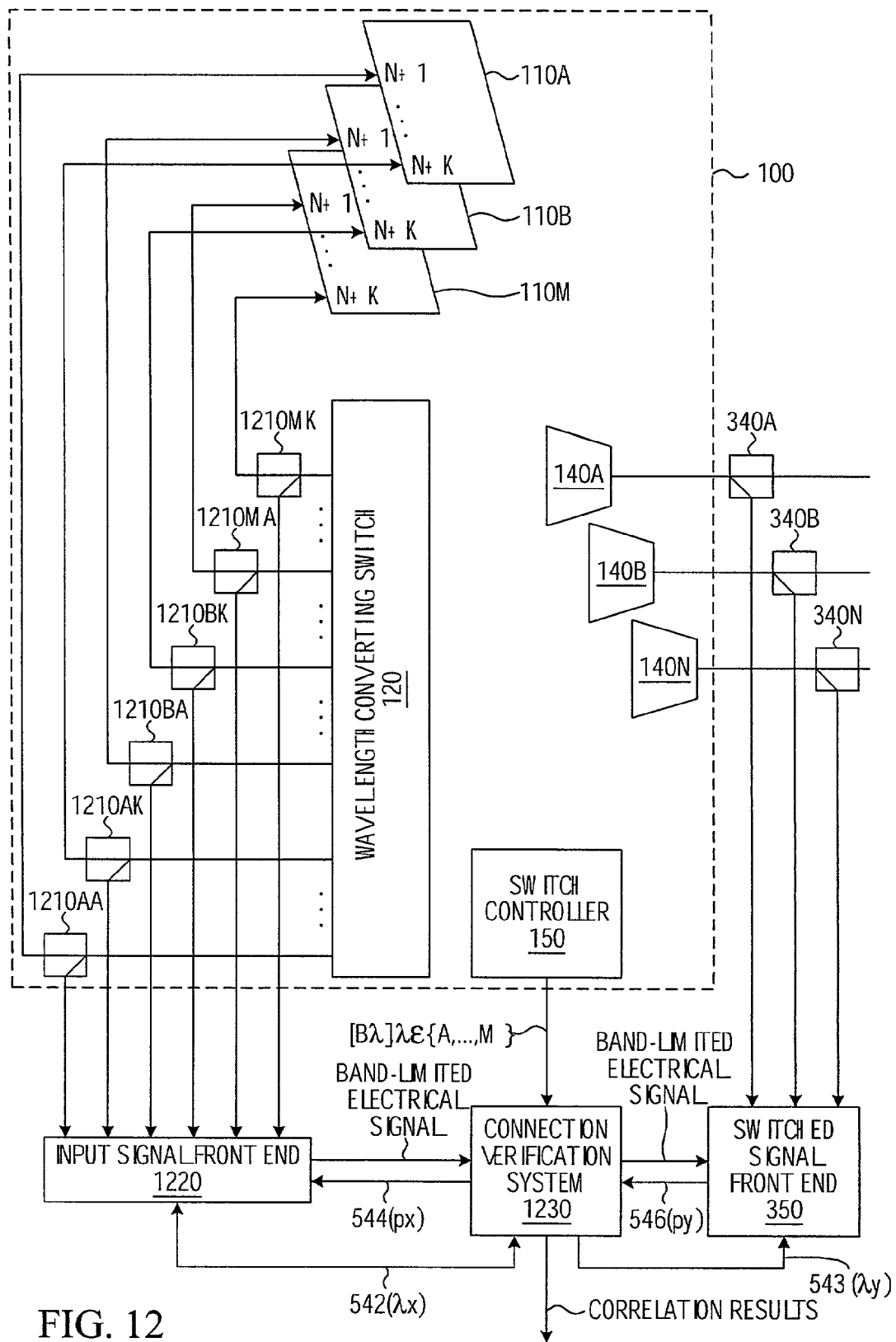
FIG. 12 is a block diagram of a subsystem used for the verification of a second subset of connections through the photonic switch of FIG. 1.

With reference first to FIG. 12, there is provided a first set of optical splitters 1210AA . . . 1210AK, 1210BA . . . 1210BK . . . , 1210MA . . . 1210MK, placed in the optical paths of the M·K single-carrier optical signals travelling between the outputs of the wavelength converting switch 120 and inputs N+1 . . . N+K of each of the optical switch matrices 110A . . . 110M. Each of the splitters 1210 diverts a small fraction of the corresponding single-carrier optical signal towards a common input signal front end 1220.

Figure 13:
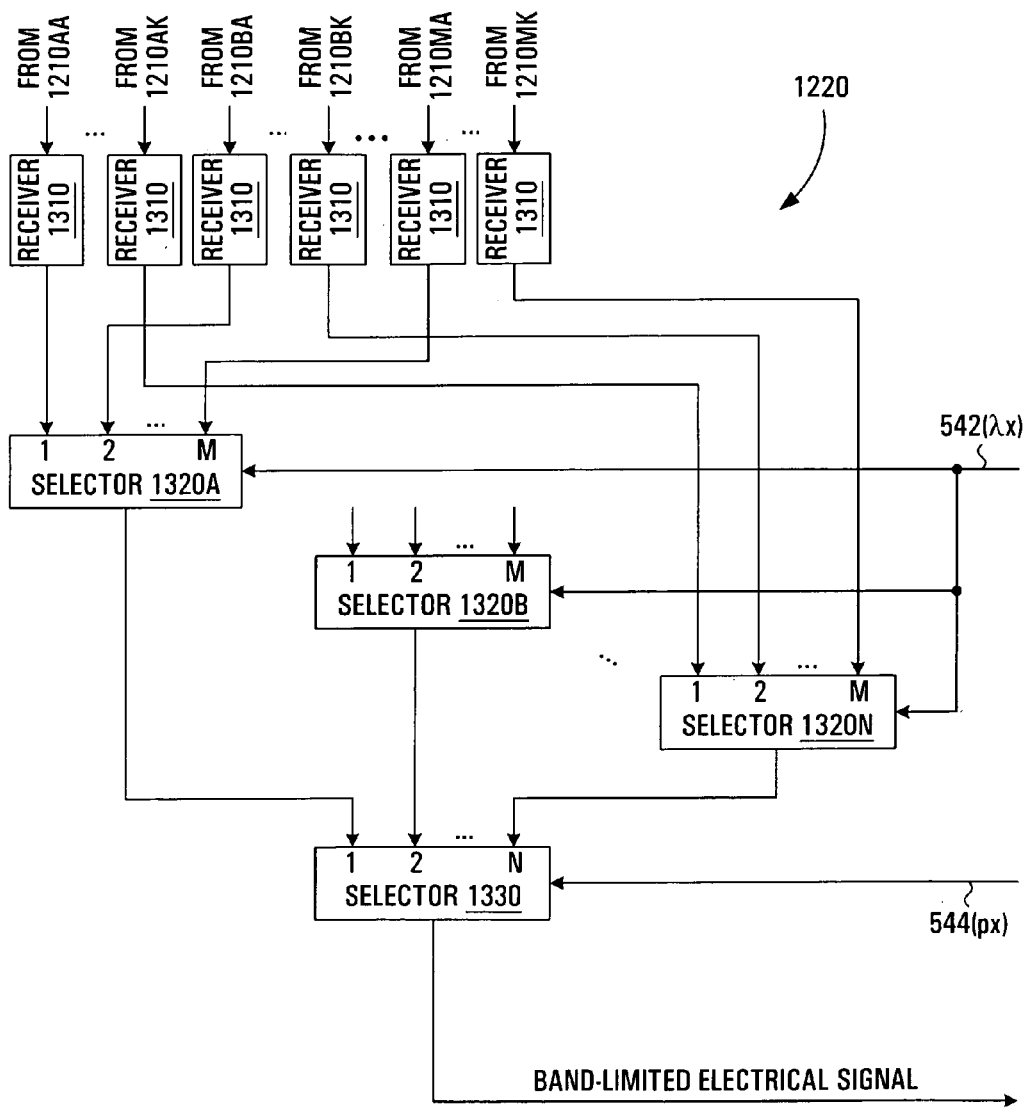
FIG. 13 is a block diagram of an input signal front end for use in the subsystem of FIG. 12.

With additional reference to FIG. 13, there is shown a detailed block diagram of a possible implementation of the input signal front end 1220. The input signal front end 1220 comprises a plurality of receivers 1310, each of which is operable to convert the corresponding incoming single-carrier optical signal into a band-limited electrical signal. Each of the receivers 1310 can be tuned to the wavelength of the corresponding single-carrier optical signal. Alternatively, the receivers 1310 can have a wide optical bandwidth. The electrical bandwidth of the receivers 1310 either sets a coarse upper bound on the bandwidth of the input signal that is used for correlation purposes within a connection verification system 1230 if that front end is followed by a precise anti-alias filter or may be a precisely determined bandwidth, in which case the additional anti-alias filter is not required. As with the front end of FIG. 4, an example of a suitable electrical bandwidth for the receivers 1310 is 100 MHz, although other higher and lower bandwidths can be used, depending on the operational requirements of the invention.

The front end 1220 also comprises a set of N first selectors 1320A . . . 1320N, each of which receives the output of M respective receivers 1310. Specifically, the first selectors 1320A . . . 1320N are arranged so that first selector 1320n (n ∈ {A, . . . , N}) receives those M electrical signals that correspond to the M optical signals provided by optical splitters 1210nA, 1210nB, . . . , 1210nM. Operation of the first selectors 1320A . . . 1320N is jointly controlled via select line 542. The output of each of the N first selectors 1320A . . . 1320N is provided to a respective input of a single second selector 1330. Operation of the second selector 1330 is controlled via select line 544. The output of the second selector 1330 is a band-limited electrical signal provided to the input signal side of the connection verification system 1230.

Continuing with the description of the subsystem in FIG. 12, there is also provided a second set of optical splitters 340A . . . 340N, one in the optical path of each switched WDM signal exiting a respective one of the WDM devices 140A . . . 140N. Each of the N optical splitters 340A . . . 340N diverts a small fraction of the corresponding switched WDM signal towards a common switched signal front end 350. The switched signal front end 350 could be designed as any of the front ends 410, 810, 910, 1010, 1110 in FIGS. 4, 8, 9, 10, 11, respectively. The switched signal front end 350 provides a band-limited electrical signal to the switched signal side of the connection verification system 1230.

Thus, it is seen that the connection verification system 1230 receives a band-limited input signal from the input signal front end 1220 and also receives a band-limited switched signal from the switched signal front end 350. In addition, the connection verification system 1230 accepts the set of mappings $[B_\lambda]$, $\lambda \epsilon \{A, \ldots, M\}$, from the switch controller 150. The connection verification system 1230 processes its inputs and produces results indicative of whether each input signal that is intended to be switched from the wavelength converting switch 120 directly out of the switching core by one of the optical switch matrices 110A . . . 110M has indeed been properly switched.

To this end, the connection verification system 1230 could be implemented virtually identically to the connection verification system 330 of FIG. 5. The only fundamental difference is that the controller in the connection verification system 1230 would run a slightly different connection verification algorithm, wherein only steps 610–614 would be required and wherein references to $A_\lambda(px, py)$, $1 \leq px$, $py \leq N$ are replaced with references to $B_\lambda(px, py)$, $1 \leq px \leq K$, $1 \leq py \leq N$.

Figure 12A:
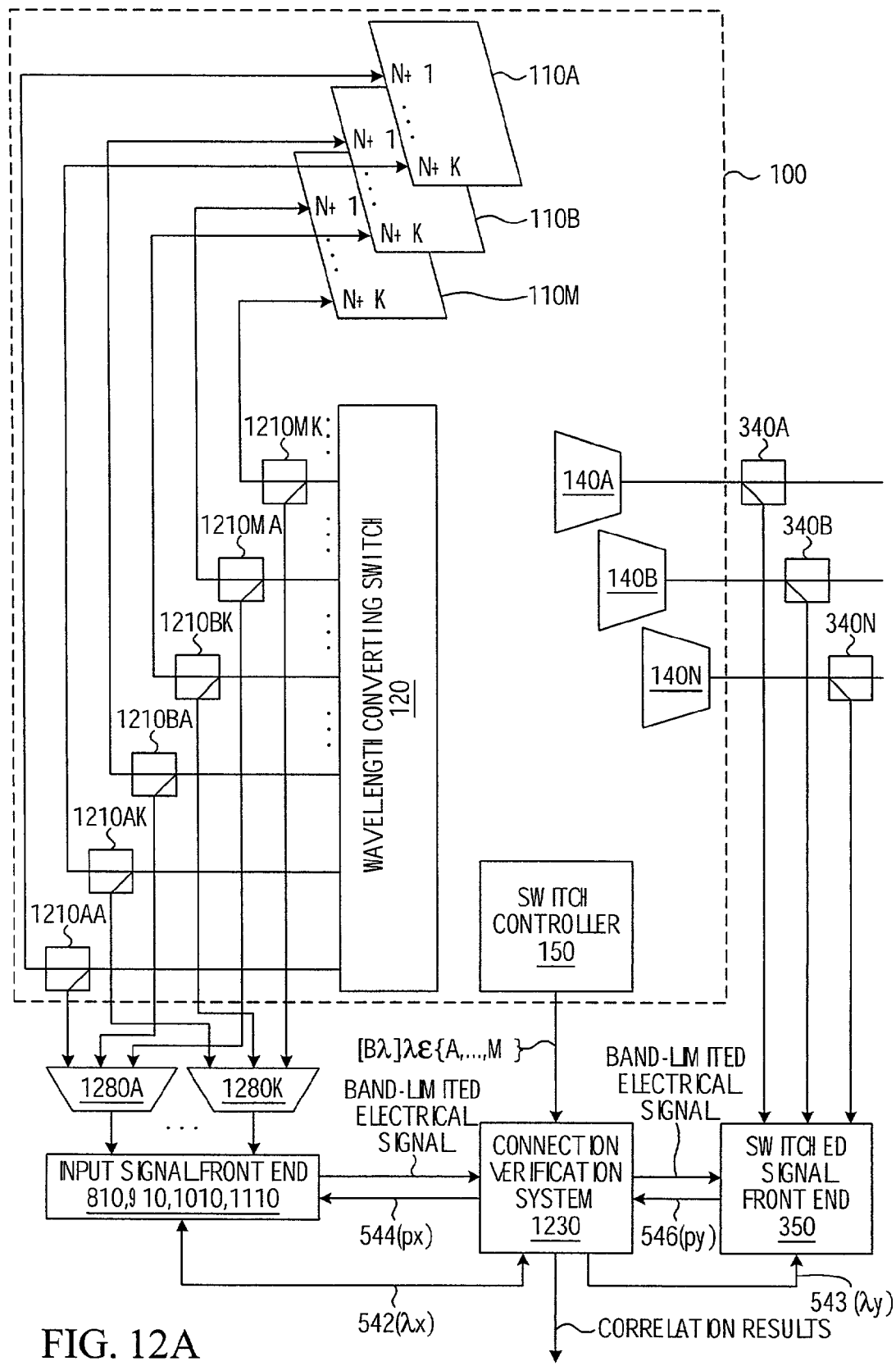
FIG. 12A is a block diagram of an alternative embodiment of the subsystem in FIG. 12.

An alternative embodiment of the subsystem of FIG. 12 is shown in FIG. 12A, wherein the outputs of the optical splitters 1210AA . . . 1210AK, 1210BA . . . 1210BK, . . . , 1210MA . . . 1210MK are regrouped by a plurality of WDM devices 1280A . . . 1280K. Specifically, the output of optical splitters 1210AA, 1210BA, . . . , 1210MA is provided to WDD device 1280A, the output of optical splitters 1210AB, 1210BB, . . . , 1210MB is provided to WDD device 1280B, etc.

In this case, only K inputs are provided to the input signal front end, which can hence be made identical to any of the front ends 810, 910, 1010 and 1110 previously described with reference to FIGS. 8, 9, 10 and 11, respectively. This alternative embodiment, which requires K additional M-way WDD devices with respect to the embodiment of FIG. 12, affords a significant reduction in the fiber interconnect linking the switching core to the connection verification system.

FIG. 14 shows a subsystem for verifying whether the set of mappings $[C_\lambda]$ is being executed properly by the optical switch matrices 110A . . . 110M. Specifically, there is provided a first set of optical splitters 310A . . . 310N, one in the optical path of each input WDM signal exiting a respective one of the WDD devices 130A . . . 130N. Each of the N optical splitters 310A . . . 310N diverts a small fraction of the corresponding input WDM signal towards a common input signal front end 320. The input signal front end 320 could be designed as any of the front ends 410, 810, 910, 1010, 1110 in FIGS. 4, 8, 9, 10, 11, respectively. The input signal front end 320 provides a band-limited electrical signal to the input signal side of a connection verification system 1430.

In addition, a second set of optical splitters 1440AA . . . 1440AK, 1440BA . . . 1440BK, . . . , 1440MA . . . 1440MK are placed in the optical paths of the M·K single-carrier optical signals travelling between outputs N+1 . . . N+K of each of the optical switch matrices 110A . . . 110M and the inputs of the wavelength converting switch 120. Each of the splitters 1440 diverts a small fraction of the corresponding single-carrier optical signal towards a common switched signal front end 1450. The switched signal front end 1450 could be implemented as the input signal front end 1220 of FIG. 12, except that select line 544 (which supplies px) would be replaced by select line 546 (which supplies py). The output of the switched signal front end 1450 is a band-limited electrical signal provided to the switched signal side of the connection verification system 1430.

Aside from accepting a band-limited input signal from the input signal front end 320 and a band-limited switched signal from the switched signal front end 1450, the connection verification system 1430 also accepts the set of mappings $[C_\lambda]$, $\lambda \epsilon \{A, \ldots, M\}$, from the switch controller 150. The connection verification system 1430 processes its inputs and produces results indicative of whether each input signal that is intended to be switched out of the switching core and into the wavelength converting switch 120 by one of the optical switch matrices 110A . . . 110M has indeed been properly switched. To this end, the connection verification system 1430 could be implemented virtually identically to the connection verification system 330 of FIG. 5, except that the controller in the connection verification system 1430 would run a slightly different connection verification algorithm, wherein references to $A_\lambda(px, py)$, $1 \leq px$, $py \leq N$ are replaced with references to $C_\lambda(px, py)$, $1 \leq px \leq N$, $1 \leq py \leq K$.

Figure 14A:
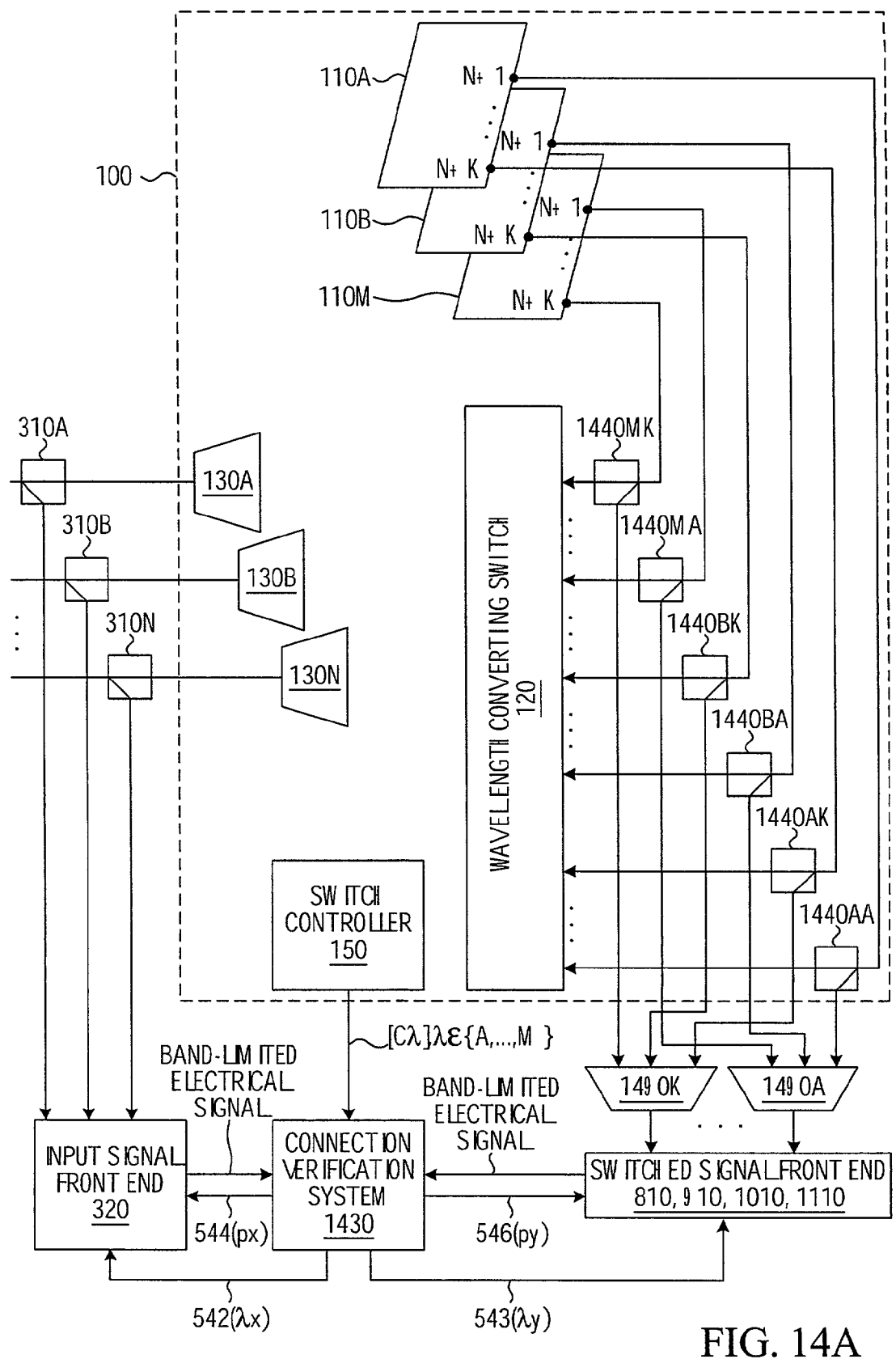
FIG. 14A is a block diagram of an alternative embodiment of the subsystem in FIG. 14.

An alternative embodiment of the subsystem of FIG. 14 is shown in FIG. 14A, wherein the outputs of the optical splitters 1440AA . . . 1440AK, 1440BA . . . 1440BK, . . . , 1440MA . . . 1440MK are regrouped by a plurality of WDM devices 1490A . . . 1490K. Specifically, the output of optical splitters 1440AA, 1440BA, . . . , 1440MA is provided to WDD device 1490A, the output of optical splitters 1440AB, 1440BB, . . . , 1440MB is provided to WDD device 1490B, etc.

In this case, only K inputs are provided to the switched signal front end, which can hence be made identical to any of the front ends 810, 910, 1010 and 1110 previously described with reference to FIGS. 8, 9, 10 and 11, respectively. This alternative embodiment, which requires K additional M-way WDD devices with respect to the embodiment of FIG. 14, affords a significant reduction in the fiber interconnect linking the switching core to the connection verification system.

Figure 15:
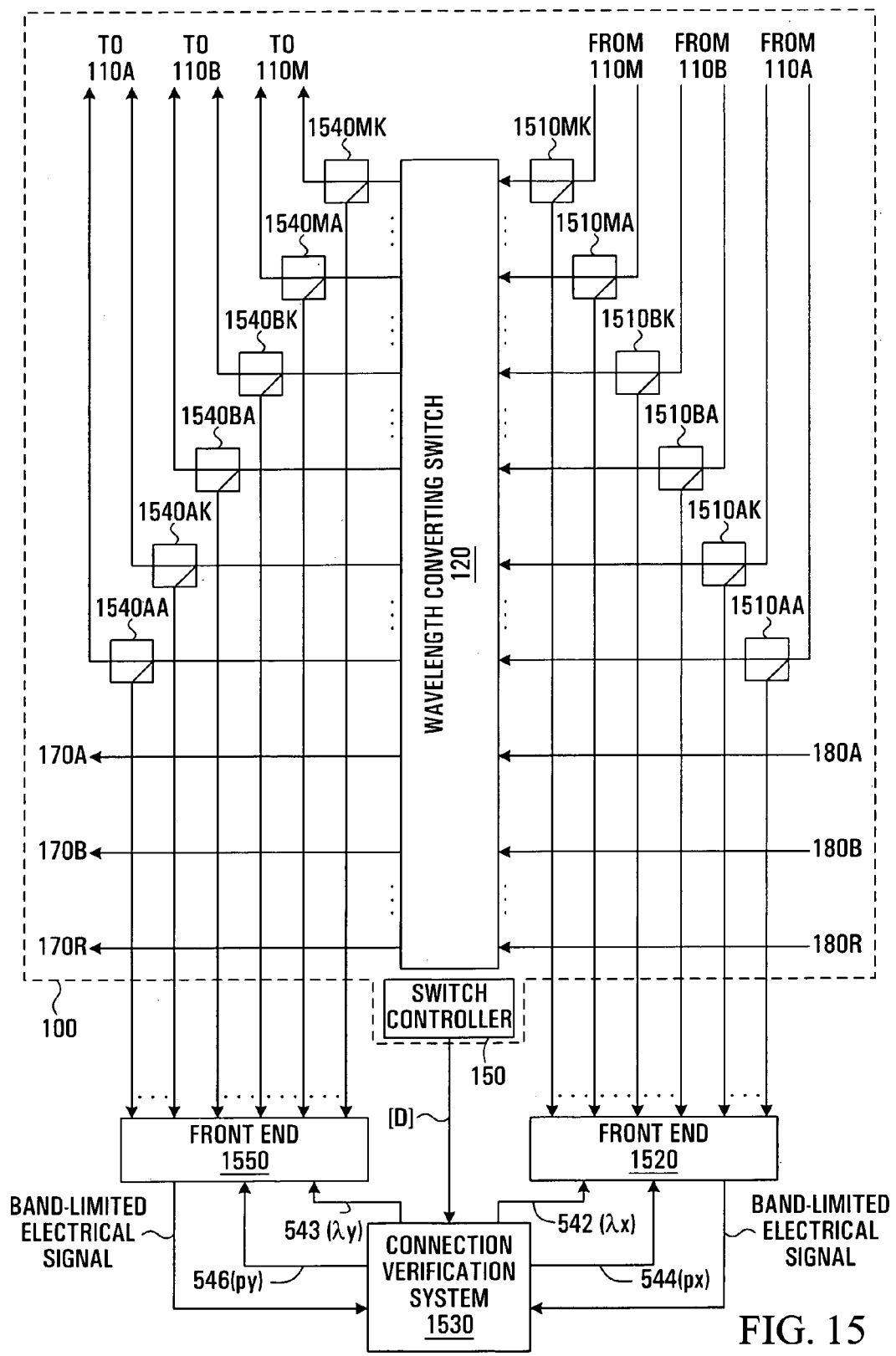
FIG. 15 is a block diagram of a subsystem used for the verification of a fourth subset of connections through the photonic switch of FIG. 1.
Figure 16:
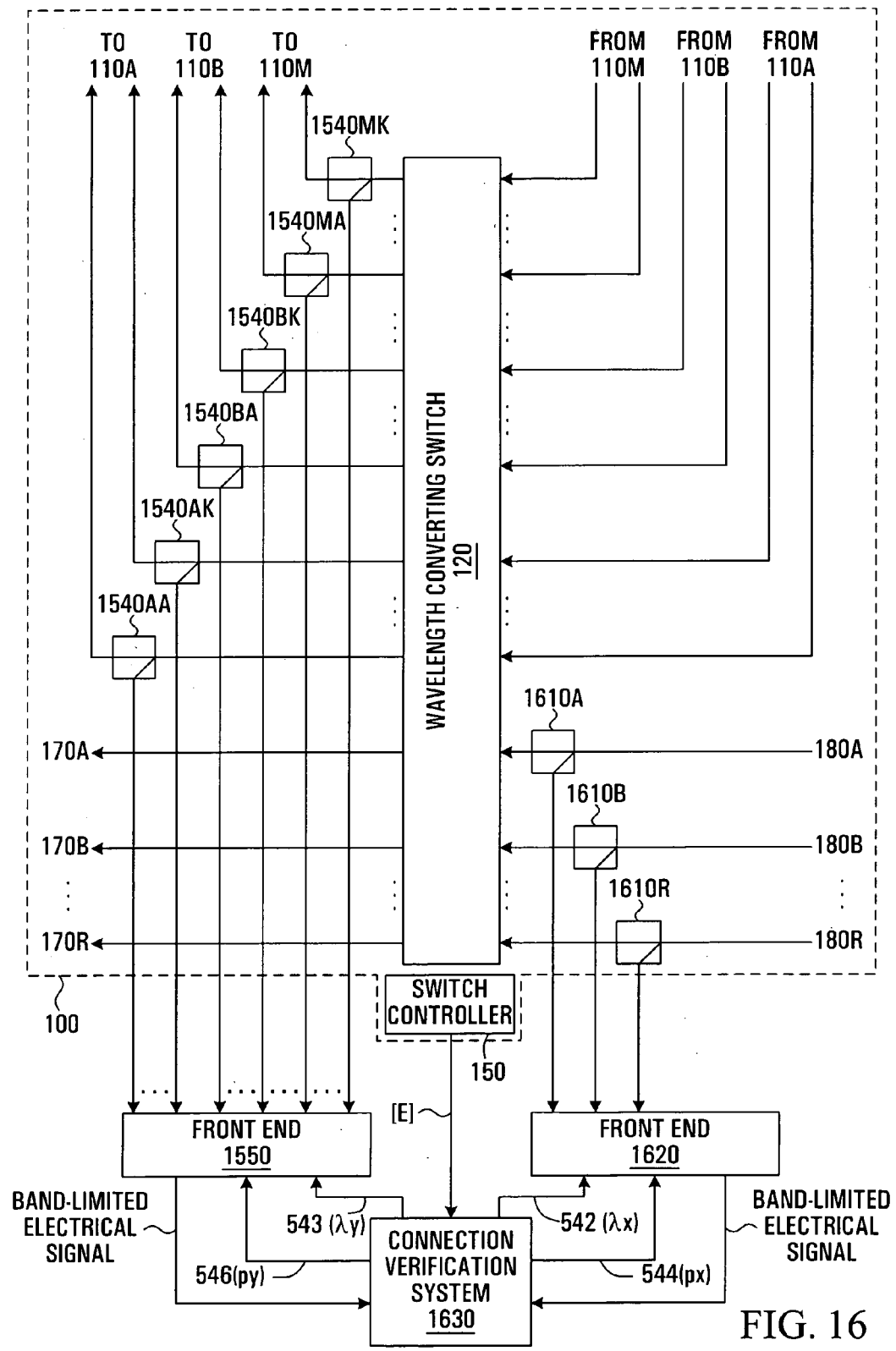
FIG. 16 is a block diagram of a subsystem used for the verification of a fifth subset of connections through the photonic switch of FIG. 1.
Figure 17:
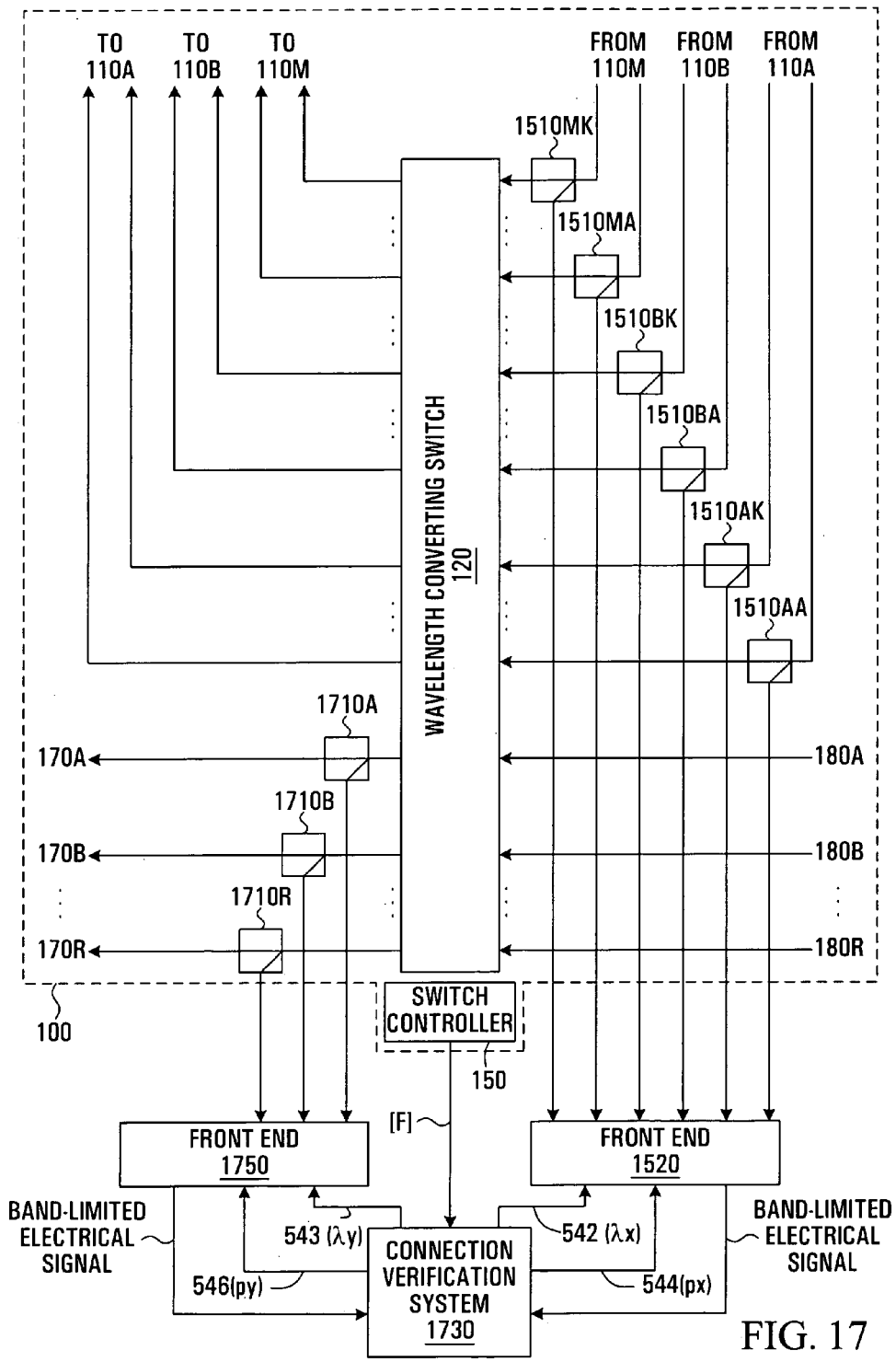
FIG. 17 is a block diagram of a subsystem used for the verification of a sixth subset of connections through the photonic switch of FIG. 1.

With reference to FIGS. 15, 16 and 17, there are shown subsystems for respectively verifying mappings [D], [E] and [F] of the wavelength converting switch 120. Specifically, in FIG. 15, optical splitters 1510AA . . . 1510AK, 1510BA . . . 1510BK, 1510MA . . . 1510MK are placed in the optical paths of the M·K single-carrier optical signals travelling between outputs N+1 . . . N+K of each of the optical switch matrices 110A . . . 110M and the inputs of the wavelength converting switch 120. Each of the splitters 1510 diverts a small fraction of the corresponding single-carrier optical signal towards a common first front end 1520. The first front end 1520 could be implemented as the input signal front end 1220 of FIG. 12. The output of the first front end 1520 is a band-limited electrical signal provided to a first signal side of a connection verification system 1530.

Also provided in the subsystem of FIG. 15 are optical splitters 1540AA . . . 1540AK, 1540BA . . . 1540BK, . . . , 1540MA . . . 1540MK, which are placed in the optical paths of the M·K single-carrier optical signals travelling between the outputs of the wavelength converting switch 120 and inputs N+1 . . . N+K of each of the optical switch matrices 110A ... 110M. Each of the splitters 1540 diverts a small fraction of the corresponding single-carrier optical signal towards a common second front end 1550. The second front end 1550 could be implemented as the input signal front end 1220 of FIG. 12, except that select line 544 (which supplies px) would be replaced by select line 546 (which supplies py). The output of the second front end 1550 is a band-limited electrical signal provided to a second signal side of the connection verification system 1530.

The connection verification system 1530 also accepts mapping [D] from the switch controller 150. The connection verification system 1530 processes its inputs and produces results indicative of whether each input signal that is intended to be switched by the wavelength converting switch 120 in accordance with mapping [D] has indeed been properly switched. To this end, the connection verification system 1530 could be implemented virtually identically to the connection verification system 330 of FIG. 5, except that the controller in the connection verification system 1530 would run a slightly different connection verification algorithm, wherein references to $A_\lambda(px, py)$, $1 \leq px, py \leq N$ are replaced with references to $D(((\lambda-1) \cdot K)+px, ((\lambda-1) \cdot K)+py)$, $1 \leq px, py \leq K$, since [D] is an M·K×M·K matrix and each $[A_\lambda]$ is an N×N matrix.

Figure 15A:
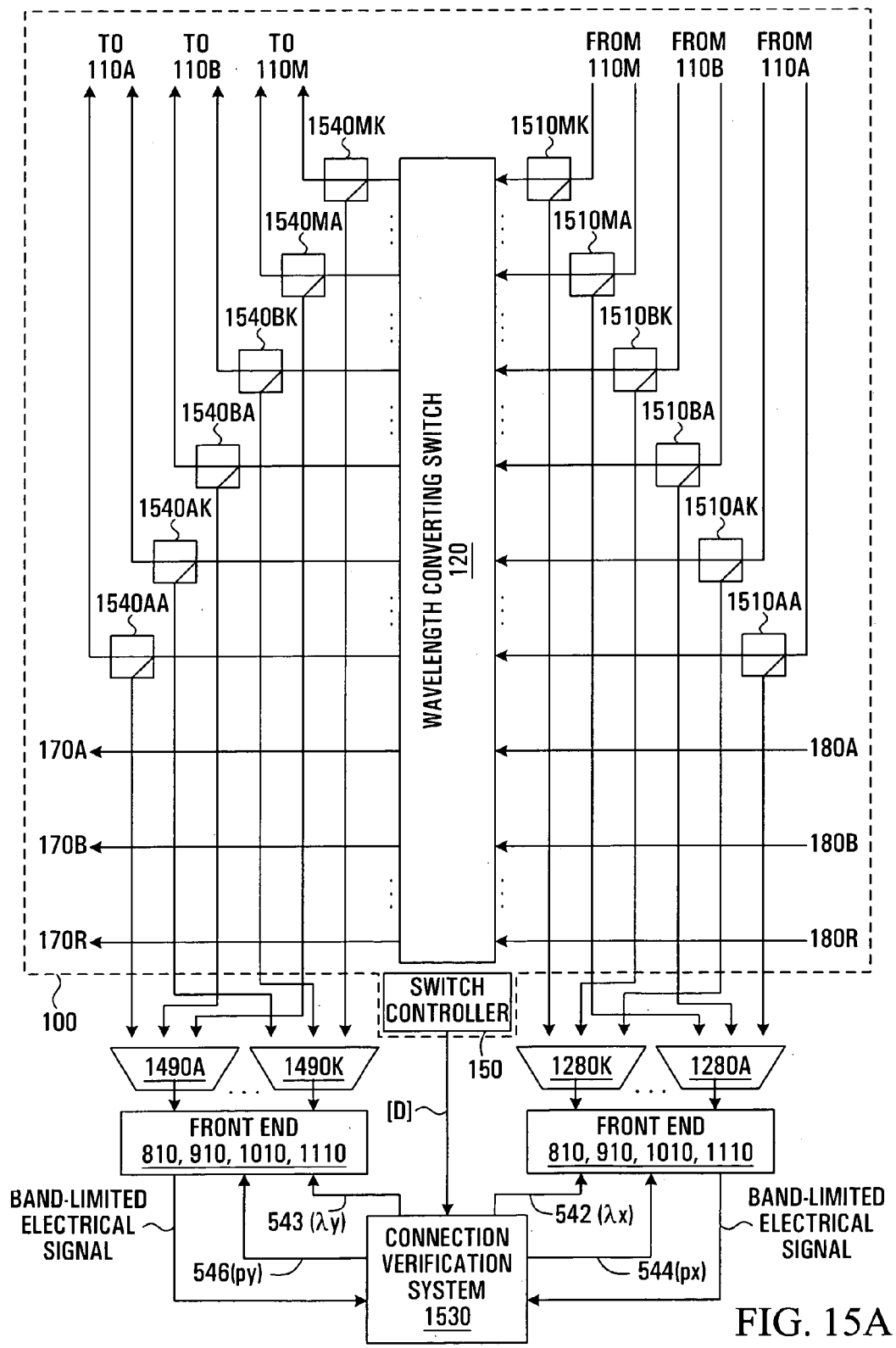
FIG. 15A is a block diagram of an alternative embodiment of the subsystem in FIG. 15.

An alternative embodiment of the subsystem of FIG. 15 is shown in FIG. 15A, wherein the outputs of the optical splitters 1510AA ... 1510AK, 1510BA ... 1510BK, ..., 1510MA ... 1510MK are regrouped by a plurality of WDM devices 1280A ... 1280K. Specifically, the output of optical splitters 1510AA, 1510BA, ..., 1510MA is provided to WDD device 1280A, the output of optical splitters 1510AB, 1510BB, ..., 1510MB is provided to WDD device 1280B, etc. In addition, there is provided a plurality of WDM devices 1490A ... 1490K for regrouping the outputs of optical splitters 1540AA, 1540BA, ..., 1540MA in a similar fashion.

In this case, only K inputs are provided to each of the front ends, which can hence be made identical to any of the front ends 810, 910, 1010 and 1110 previously described with reference to FIGS. 8, 9, 10 and 11, respectively. This alternative embodiment, which requires 2·K additional M-way WDD devices with respect to the embodiment of FIG. 15, affords a significant reduction in the fiber interconnect linking the switching core to the connection verification system.

FIG. 16 is similar to FIG. 15 in that it retains the optical splitters 1540AA ... 1540AK, 1540BA ... 1540BK, ..., 1540MA ... 1540MK, and the second front end 1550. However, the subsystem of FIG. 16 includes a plurality of optical splitters 1610A ... 1610R, which are placed in the optical paths of the R add carriers 180A ... 180R. Each of the splitters 1610 diverts a small fraction of the corresponding single-carrier optical signal towards a common first front end 1620, which could be implemented as a scaled version of the second front end 1550. The band-limited electrical signals output by the first and second front ends 1620, 1550 are fed to a connection verification system 1630, which also accepts mapping [E] from the switch controller 150.

The connection verification system 1630 processes its inputs and produces results indicative of whether each add carrier that is intended to be switched by the wavelength converting switch 120 in accordance with mapping [E] has indeed been properly switched. To this end, the connection verification system 1630 could be implemented virtually identically to the connection verification system 330 of FIG. 5, except that the controller in the connection verification system 1630 would run a slightly different connection verification algorithm, wherein references to $A_\lambda(px, py)$, $1 \leq px, py \leq N$ are replaced with references to $E(px, ((\lambda-1) \cdot K)+py)$, $1 \leq px \leq R, 1 \leq py \leq K$, since [E] is an R×M·K matrix and each $[A_\lambda]$ is an N×N matrix.

Figure 16A:
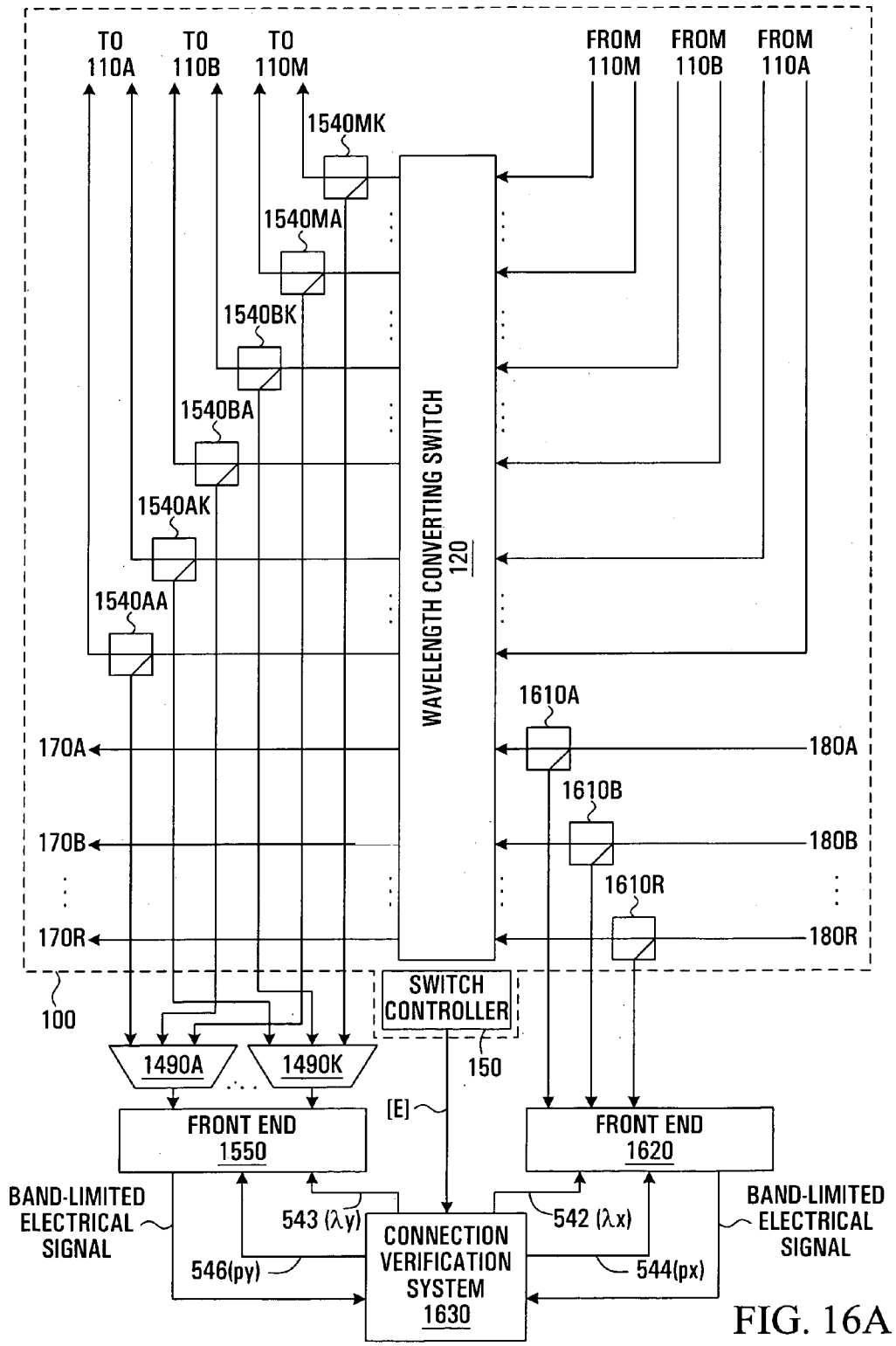
FIG. 16A is a block diagram of an alternative embodiment of the subsystem in FIG. 16.

An alternative embodiment of the subsystem of FIG. 16 is shown in FIG. 16A, wherein the outputs of the optical splitters 1540AA ... 1540AK, 1540BA ... 1540BK, ..., 1540MA ... 1540MK are regrouped by a plurality of WDM devices 1490A ... 1490K. Specifically, the output of optical splitters 1540AA, 1540BA, ..., 1540MA is provided to WDD device 1490A, the output of optical splitters 1540AB, 1540BB, ..., 1540MB is provided to WDD device 1490B, etc.

In this case, only K inputs are provided to the front end (formerly 1550 in FIG. 16), which can hence be made identical to any of the front ends 810, 910, 1010 and 1110 previously described with reference to FIGS. 8, 9, 10 and 11, respectively. This alternative embodiment, which requires K additional M-way WDD devices with respect to the embodiment of FIG. 16, affords a significant reduction in the fiber interconnect linking the switching core to the connection verification system.

With reference now to FIG. 17, there is shown a subsystem which is similar to that of FIG. 15 in that it retains the optical splitters 1510AA ... 1510AK, 1510BA ... 1510BK, ..., 1510MA ... 1510MK, and the first front end 1520. However, the subsystem of FIG. 17 includes a plurality of optical splitters 1710A ... 1710R, which are placed in the optical paths of the R drop carriers 170A ... 170R. Each of the splitters 1710 diverts a small fraction of the corresponding single-carrier optical signal towards a common second front end 1750, which could be implemented as a scaled version of the first front end 1520. The band-limited electrical signals output by the first and second front ends 1520, 1750 are fed to a connection verification system 1730, which also accepts mapping [F] from the switch controller 150.

The connection verification system 1730 processes its inputs and produces results indicative of whether each of the signals arriving from the optical switch matrices 110A–110M and intended to be switched towards one of the drop carriers 170A ... 170R in accordance with mapping [F] has indeed been properly switched. To this end, the connection verification system 1730 could be implemented virtually identically to the connection verification system 330 of FIG. 5, except that the controller in the connection verification system 1730 would run a slightly different connection verification algorithm, wherein references to $A_\lambda(x, y)$, $1 \leq px, py \leq N$ are replaced with references to $E(((\lambda-1) \cdot K)+px, py)$, $1 \leq px \leq K, 1 \leq py \leq R$, since [E] is an M·K×R matrix and each $[A_\lambda]$ is an N×N matrix.

Figure 17A:
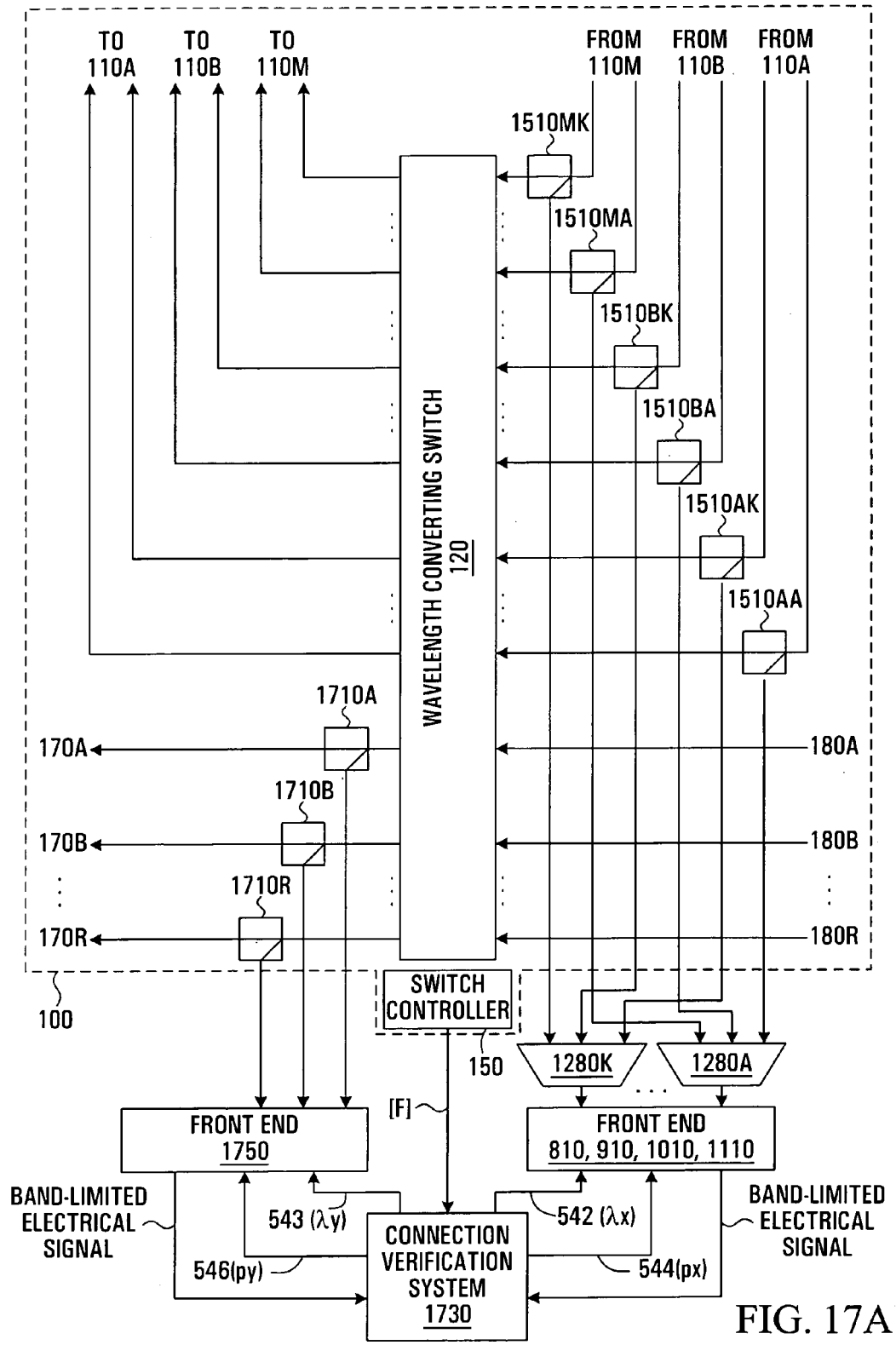
FIG. 17A is a block diagram of an alternative embodiment of the subsystem in FIG. 17.

An alternative embodiment of the subsystem of FIG. 17 is shown in FIG. 17A, wherein the outputs of the optical splitters 1510AA ... 1510AK, 1510BA ... 1510BK, ..., 1510MA ... 1510MK are regrouped by a plurality of WDM devices 1280A ... 1280K. Specifically, the output of optical splitters 1510AA, 1510BA, ..., 1510MA is provided to WDD device 1280A, the output of optical splitters 1510AB, 1510BB, ..., 1510MB is provided to WDD device 1280B, etc.

In this case, only K inputs are provided to the front end (formerly 1520 in FIG. 17), which can hence be made identical to any of the front ends 810, 910, 1010 and 1110 previously described with reference to FIGS. 8, 9, 10 and 11, respectively. This alternative embodiment, which requires K additional M-way WDD devices with respect to the embodiment of FIG. 17, affords a significant reduction in the fiber interconnect linking the switching core to the connection verification system.

It should be understood that all or part of the input signal front end and/or the switched signal front end in any of the above described embodiments may be shared with a power spectrum flattening system such as that described in U.S. patent application Ser. No. 09/580,495 to Graves et al., filed May 30, 2000, entitled "Optical Switch with Power Equalization", assigned to the assignee of the present invention and hereby incorporated by reference herein.

It should further be appreciated that in some embodiments of the invention, all or part of the functionality previously described herein with respect to the controller 540 and the differential correlators 560A ... 560G may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the controller 540 and the differential correlators 560A ... 560G may be implemented as software consisting of a series of instructions for execution by a computer system. The series of instructions may be written in a number of programming languages for use with many computer architectures or operating systems. For example, some embodiments may be implemented in a procedural programming language (e.g., "C") or an object oriented programming language (e.g., "C++" or "JAVA").

The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

We claim:

1. A system for verifying connections established through a switching unit adapted to receive a plurality of input signals and output a plurality of switched signals, comprising:
    a selection unit for controllably admitting at least one pair of signals, each pair of signals being an admitted pair of signals and including one of the input signals and one of the switched signals; and
    a verification unit connected to the selection unit, for:
        controlling operation of the selection unit as a function of a connection map; and
        for a given admitted pair of signals, correlating the one of the input signals of the given admitted pair of signals with the one of the switched signals of the given admitted pair of signals so as to determine whether one of the connections established through the switching unit is consistent with the connection map.

2. A system as claimed in claim 1, wherein the connection map defines, for each input signal, a particular one of the switched signals that is expected to be correlated with that input signal, the verification unit being operable to perform the steps of:
    causing the selection unit to admit, together with each input signal, the switched signal expected to be correlated with that input signal;
    processing the pair of admitted signals to determine a level of correlation or anti-correlation there between; and
    if the level of correlation is significant or the level of anti-correlation is insignificant, concluding that the connection involving the admitted input signal is consistent with the connection map.

3. A system as claimed in claim 2, the verification unit being further operable to perform the step of:
    if the level of correlation is insignificant or the level of anti-correlation is significant:
        (1) causing the selection unit to admit, together with said input signal, a switched signal not expected to be correlated with said input signal;
        (2) processing the pair of admitted signals to determine the level of correlation or anti-correlation there between;
        (3) if the level of correlation is significant or the level of anti-correlation is insignificant, concluding that said input signal has been mis-connected; otherwise:
            (3.1) if all switched signals not expected to be correlated with said input signal have been exhausted, concluding that the connection involving said input signal has been lost; otherwise:
                (3.1.1) causing the selection unit to admit, together with said input signal, a different switched signal not expected to be correlated with said input signal and repeating steps (2) and (3).

4. A system as claimed in claim 1, wherein the verification unit comprises:
    a first sampling unit for sampling the by the one of the input signals of the given admitted pair of signals, thereby to create a first sample stream;
    a second sampling unit for sampling the one of the switched signals of the given admitted pair of signals, thereby to create a second sample stream;
    a first delay line for receiving the first sample stream, comprising a plurality of taps interspersed by delay elements;
    a second delay line for receiving the second sample stream, comprising a plurality of taps interspersed by delay elements;
    a plurality of anti-correlators, each having a first input connected to a tap in the first delay line and a second input connected to a tap in the second delay line, each anti-correlator being adapted to produce an anti-correlation value at a distinct relative delay; and
    a minimum detector connected to the anti-correlators, for selecting the least among the anti-correlation values produced by the anti-correlators and providing the result to a controller.

5. A system as claimed in claim 4, wherein the first and second sampling units each comprise an anti-alias filter, a sampler and an analog-to-digital converter.

6. A system as claimed in claim 4, wherein each anti-correlator is adapted to produce an anti-correlation value that is a function of the difference between the values of the samples appearing at its first and second inputs.

7. A system as claimed in claim 4, wherein each anti-correlator is adapted to produce an anti-correlation value from an input signal x(i) and a switched signal y(i) that is substantially equal to a moving average value of $(x(i-s)-y(i))^2$, where "s" represents a constant relative delay between the two signals.

8. A system as claimed in claim 1, wherein the verification unit comprises:
- a first sampling unit for sampling the one of the input signals of the given admitted pair of signals, thereby to create a first sample stream;
- a second sampling unit for sampling the one of the switched signals of the given admitted pair of signals, thereby to create a second sample stream;
- a first delay line for receiving the first sample stream, comprising a plurality of taps interspersed with delay elements;
- a second delay line for receiving the second sample stream, comprising a plurality of taps interspersed with delay elements;
- a plurality of correlators, each having a first input connected to a tap in the first delay line and a second input connected to a tap in the second delay line, each correlator being adapted to produce a correlation value; and
- a maximum detector connected to the correlators, for selecting the greatest among the correlation values produced by the correlators and providing the result to a controller.

9. A system as claimed in claim 8, wherein the first and second sampling units each comprise an anti-alias filter, a sampler and an analog-to-digital converter.

10. A system as claimed in claim 1, wherein the selection unit comprises an arrangement of at least one first multiplexer for allowing selection of the one of the input signals and at least one second multiplexer for allowing selection of the one of the switched signals.

11. A system as claimed in claim 1, wherein the selection unit comprises means for reducing the bandwidth of the admitted signals relative to the signals entering the selection unit.

12. A system as claimed in claim 1, wherein the selection unit comprises means for causing conversion of the one of the input signals and of the one of the switched signals from optical to electrical format.

13. A system as claimed in claim 12, wherein the selection unit comprises circuitry for admitting an input signal as a function of an input wavelength and an input port and for admitting a switched signal as a function of a switched wavelength and a switched port.

14. A system as claimed in claim 1, wherein said verification unit is operative to perform relative-delay-dependent signal processing operations on low-frequency portions of the one of the input signals of the given admitted pair of signals and of the one of the switched signals of the given admitted pair of signals for correlating the one of the input signals of the given admitted pair of signals with the one of the switched signals of the given admitted pair of signals.

15. A method of validating connections established through a switching unit adapted to receive a plurality of input signals and output a plurality of switched signals, comprising:
- causing admission of at least one pair of signals, each pair of signals being an admitted pair of signals and including one of the input signals and one of the switched signals expected to be correlated with one another on the basis of a connection map;
- for a given admitted pair of signals, correlating the one of the input signals of the given admitted pair of signals with the one of the switched signals of the given admitted pair of signals to determine a level of correlation or anti-correlation between the one of the input signals of the given admitted pair of signals and the one of the switched signals of the given admitted pair of signals; and
- if the level of correlation is significant or the level of anti-correlation is insignificant, concluding that the connection involving the one of the input signals of the given admitted pair of signals is consistent with the connection map.

16. A method as claimed in claim 15, further comprising:
- if the level of correlation is insignificant or the level of anti-correlation is significant:
  - (1) determining the level of correlation or anti-correlation between the selected input signal and a switched signal not expected to be correlated with that input signal;
  - (2) if the level of correlation is significant or the level of anti-correlation is insignificant, concluding that the selected input signal has been mis-connected; otherwise:
    - (2.1) if all switched signals not expected to be correlated with the selected input signal have been exhausted, concluding that the connection involving the selected input signal has been lost; otherwise:
      - (2.1.1) repeating steps (1) and (2) with a different switched signal not expected to be correlated with the selected input signal.

17. A method as claimed in claim 15, wherein selecting one of the input signals includes specifying a port and wavelength associated with the selected input signal and wherein accessing each switched signal includes specifying a port and wavelength associated with that switched signal.

18. A method as claimed in claim 15, wherein correlating the one of the input signals of the given admitted pair of signals with the one of the switched signals of the given admitted pair of signals includes performing relative-delay-dependent signal processing operations on low-frequency portions of the one of the input signals of the given admitted pair of signals and of the one of the switched signals of the given admitted pair of signals.

19. A method as claimed in claim 15, wherein determining the anti-correlation between an input signal x(i) and a switched signal y(i) comprises evaluating a moving average value of $(x(i-s)-y(i))^2$, where "s" represents a constant relative delay between the two signals.

20. A system for validating connections established through a switching unit adapted to receive a plurality of input signals and output a plurality of switched signals, comprising:
- means for causing admission of at least one pair of signals, each pair of signals being an admitted pair of signals and including one of the input signals and one of the switched signals expected to be correlated with one another on the basis of a connection map;
- means for, for a given admitted pair of signals, correlating the one of the input signals of the given admitted pair of signals with the one of the switched signals of the given admitted pair of signals to determine a level of correlation or anti-correlation between the one of the input signals of the given admitted pair of signals and the one of the switched signals of the given admitted pair of signals; and
- means for concluding that the connection involving the one of the input signals of the given admitted pair of signals is consistent with the connection map if the level of correlation is significant or the level of anti-correlation is insignificant.

21. An apparatus for validating connections established through a switching unit adapted to receive a plurality of input signals and output a plurality of switched signals, comprising:
   a mechanism constructed and adapted to admit at least one pair of signals, each pair of signals being an admitted pair of signals and including one of the input signals and one of the switched signals expected to be correlated with one another on the basis of a connection map;
   a mechanism constructed and adapted to, for a given admitted pair of signals, correlate the one of the input signals of the given admitted pair of signals with the one of the switched signals of the given admitted pair of signals to determine a level of correlation or anti-correlation between the one of the input signals of the given admitted pair of signals and the one of the switched signals of the given admitted pair of signals; and
   a mechanism constructed and adapted to conclude that the connection involving the one of the input signals of the given admitted pair of signals is consistent with the connection map if the level of correlation is significant or the level of anti-correlation is insignificant.

22. Computer-readable media tangibly embodying a program of instructions executable by a computer to perform a method of validating connections established through a switching unit adapted to receive a plurality of input signals and output a plurality of switched signals, the method comprising:
   causing admission of at least one pair of signals, each pair of signals being an admitted pair of signals and including one of the input signals
   and one of the switched signals expected to be correlated with one another on the basis of a connection map;
   for a given admitted pair of signals, correlating the one of the input signals of the given admitted pair of signals with the one of the switched signals of the given admitted pair of signals to determine a level of correlation or anti-correlation between the one of the input signals of the given admitted pair of signals and the one of the switched signals of the given admitted pair of signals; and
   if the level of correlation is significant or the level of anti-correlation is insignificant, concluding that the connection involving the one of the input signals of the given admitted pair of signals is consistent with the connection map.

23. At least one computer programmed to execute a process for validating connections established through a switching unit adapted to receive a plurality of input signals and output a plurality of switched signals, the process comprising:
   causing admission of at least one pair of signals, each pair of signals being an admitted pair of signals and including one of the input signals
   and one of the switched signals expected to be correlated with one another on the basis of a connection map;
   for a given admitted pair of signals, correlating the one of the input signals of the given admitted pair of signals with the one of the switched signals of the given admitted pair of signals to determine a level of correlation or anti-correlation between the one of the input signals of the given admitted pair of signals and the one of the switched signals of the given admitted pair of signals; and
   if the level of correlation is significant or the level of anti-correlation is insignificant, concluding that the connection involving the one of the input signals of the given admitted pair of signals is consistent with the connection map.

24. A switch for optical signals, comprising:
   a switching core for switching a plurality of input optical signals as a function of a connection map and outputting a plurality of switched optical signals; and
   a connection verification system connected to the switching core, the connection verification system comprising:
   a selection unit for controllably admitting at least one pair of signals, each pair of signals being an admitted pair of signals and including one of the input optical signals and one of the switched optical signals; and
   a verification unit connected to the selection unit, for:
      controlling operation of the selection unit as a function of the connection map; and
      for a given admitted pair of signals, correlating the one of the input optical signals of the given admitted pair of signals with the one of the switched optical signals of the given admitted pair of signals so as to determine whether a connection established through the switching core is consistent with the connection map.

25. A switch as claimed in claim 24, wherein the switching core comprises:
   a plurality of optical switch matrices, each optical switch matrix dedicated to a distinct wavelength and having a plurality of inputs and a plurality of outputs, each optical switch matrix being adapted to establish wavelength-preserving connections between its inputs and its outputs.

26. In combination, the switch of claim 25 and a power spectrum flattening system.

27. A switch as claimed in claim 25, further comprising:
   a plurality of wavelength division demultiplexing (WDD) devices, each having an input port and a plurality of output ports;
   a plurality of wavelength division multiplexing (WDM) devices, each having an output port and a plurality of input ports; and wherein the inputs of each optical switch matrix are connected to the like-wavelength output ports of the WDD devices; and wherein the outputs of each optical switch matrix are connected to the like-wavelength input ports of the WDM devices.

28. A switch as claimed in claim 27, wherein the connection verification system is coupled to the inputs of the WDD devices and to the outputs of the WDM devices.

29. A switch as claimed in claim 28, wherein the connection map is defined by a set of sub-maps including a sub-map for each optical switch matrix defining a desired interconnection pattern between the inputs of that optical switch matrix leading from the WDD devices and the outputs of that optical switch matrix leading to the WDM devices, and wherein the selection unit comprises:
   a first selection unit for controllably extracting single-carrier input signals from among the signals leading from the inputs of the WOD devices; and
   a second selection unit for controllably extracting single-carrier switched signals from among the signals leading from the outputs of the WDM devices;

wherein the verification unit is connected to the first and second selection units, for controlling operation of the first and second selection units as a function of the sub-maps and performing relative-delay-dependent signal processing operations on the signals extracted by the selection units so as to identify connections established by each optical switch matrix and to determine their consistency with the associated sub-map.

30. A switch as claimed in claim 29, wherein the first selection unit allows selection of an input signal as a function of its wavelength and position among the inputs of the optical switch matrix at that wavelength.

31. A switch as claimed in claim 29, wherein the verification unit is operable to:
   coordinate operation of the first and second selection units such that the switched signal extracted by the second selection unit is expected to be correlated with the input signal extracted by the first selection unit
   process the single-carrier input signal extracted by the first selection unit and the single-carrier switched signal extracted by the second selection unit in order to determine a level of correlation or anti-correlation there between; and
   if the level of correlation is significant or the level of anti-correlation is insignificant, concluding that the connection involving the extracted input signal is consistent with the connection map.

32. A system as claimed in claim 29, wherein all single-carrier optical signals are digitally wrapped and include a header, wherein the header is designed to contain specific low-frequency signal content.

33. In combination, the switch of claim 29 and a power spectrum flattening system, wherein at least part of the first or second selection unit is shared between the switch and the power spectrum flattening system.

34. A switch as claimed in claim 29, wherein the second selection unit allows selection of a switched signal as a function of its wavelength and position among the outputs of the optical switch matrix at that wavelength.

35. A switch as claimed in claim 30, wherein the first selection unit comprises:
   a plurality of first local WOD devices for receiving a plurality of multi-carrier optical signals tapped prior to entering the first WDD devices;
   a bank of optical receivers connected to the outputs of the first local WDD devices, for converting the respective optical signals into electrical form;
   a plurality of first selectors, each having a plurality of inputs, each such input on a given selector being associated with an output from a different one of the first local WDD devices and thereby permitting wavelength selection; and
   a second selector connected to an output of each of the first selectors, thereby permitting selection of the position of the input of the optical switch matrix in the switching core.

36. A switch as claimed in claim 31, the verification unit being further operable to perform the step of:
   if the level of correlation is insignificant or the level of anti-correlation is significant:
   (1) coordinating operation of the first and second selection units such that the switched signal extracted by the second selection unit is expected not to be correlated with the input signal extracted by the first selection unit;
   (2) processing the pair of extracted signals to determine the level of correlation or anti-correlation there between;
   (3) if the level of correlation is significant or the level of anti-correlation is insignificant, concluding that said input signal has been mis-connected; otherwise:
     (3.1) if all switched signals not expected to be correlated with said input signal have been exhausted, concluding that the connection involving said input signal has been lost; otherwise:
       (3.1.1) coordinating operation of the first and second selection units such that a different switched signal extracted by the second selection unit is expected not to be correlated with the input signal extracted by the first selection unit and repeating steps (2) and (3).

37. A switch as claimed in claim 34, wherein the second selection unit comprises:
   a plurality of first local WDD devices for receiving a plurality of multi-carrier optical signals tapped from the outputs of the WDM devices;
   a bank of optical receivers connected to the outputs of the first local WDD devices, for converting the respective optical signals into electrical form;
   a plurality of first selectors, each having a plurality of inputs, each such input on a given selector being associated with an output from a different one of the first local WDD devices and thereby permitting wavelength selection; and
   a second selector connected to an output of each of the first selectors, thereby permitting selection of the position of the output of the optical switch matrix in the switching core.

38. A switch as claimed in claim 36, wherein the verification unit comprises:
   a first sampling unit for sampling the input signal extracted by the first selection unit, thereby to create a first sample stream;
   a second sampling unit for sampling the switched signal extracted by the second selection unit, thereby to create a second sample stream;
   a first delay line for receiving the first sample stream, comprising a plurality of taps interspersed by delay elements;
   a second delay line for receiving the second sample stream, comprising a plurality of taps interspersed by delay elements;
   a plurality of anti-correlators, each having a first input connected to a tap in the first delay line and a second input connected to a tap in the second delay line, each anti-correlator being adapted to produce an anti-correlation value at a distinct relative delay; and
   a minimum detector connected to the anti-correlators, for selecting the least among the anti-correlation values produced by the anti-correlators and providing the result to a controller.

39. A system as claimed in claim 36, wherein the verification unit comprises:
   a first sampling unit for sampling the input signal extracted by the first selection unit, thereby to create a first sample stream;
   a second sampling unit for sampling the switched signal extracted by the second selection unit, thereby to create a second sample stream;
   a first delay line for receiving the first sample stream, comprising a plurality of taps interspersed with delay elements;

a second delay line for receiving the second sample stream, comprising a plurality of taps interspersed with delay elements;

a plurality of correlators, each having a first input connected to a tap in the first delay line and a second input connected to a tap in the second delay line, each correlator being adapted to produce a correlation value; and a maximum detector connected to the correlators, for selecting the greatest among the correlation values produced by the correlators and providing the result to a controller.

40. A system as claimed in claim 38, wherein the first and second sampling units each comprise an anti-alias filter, a sampler and an analog-to-digital converter.

41. A system as claimed in claim 38, wherein each anti-correlator is adapted to produce an anti-correlation value from an input signal $x(i)$ and a switched signal $y(i)$ that is substantially equal to a moving average value of $(x(i-s)-y(i))^2$, where "s" represents a constant relative delay between the two signals.

42. A system as claimed in claim 39, wherein the first and second sampling units each comprise an anti-alias filter, a sampler and an analog-to-digital converter.

43. A system as claimed in claim 38, wherein each anti-correlator is adapted to produce an anti-correlation value that is a function of the difference between the values of the samples appearing at its first and second inputs.

44. A system for correlating a first sample stream with a second sample stream, comprising:

a first delay line for receiving the first sample stream, comprising a plurality of taps interspersed by delay elements;

a second delay line for receiving the second sample stream, comprising a plurality of taps interspersed by delay elements;

a plurality of anti-correlators, each having a first input connected to a tap in the first delay line and a second input connected to a tap in the second delay line, each anti-correlator being adapted to produce an anti-correlation value at a distinct relative delay; and a minimum detector connected to the anti-correlators, for selecting the least among the anti-correlation values produced by the anti-correlators and providing the result to a controller.

45. A system as claimed in claim 44, wherein each anti-correlator is adapted to produce an anti-correlation value that is a function of the difference between the values of the samples appearing at its first and second inputs.

46. A system as claimed in claim 44, wherein each anti-correlator is adapted to produce an anti-correlation value from an input signal $x(i)$ and a switched signal $y(i)$ that is substantially equal to a moving average value of $(x(i-s)-y(i))^2$, where "s" represents a constant relative delay between the two signals.

47. A system as claimed in claim 44, wherein each anti-correlator is uniquely associated with a relative delay existing between the sample streams at its first and second inputs.

48. A system as claimed in claim 44, wherein each tap in the first and second delay lines is connected to at most one of said anti-correlators.

49. A system as claimed in claim 44, wherein at least one tap in the first or second delay line is connected to more than one said anti-correlators.

50. A system as claimed in claim 44, wherein the delay elements are embodied as shift registers.

51. A system as claimed in claim 46, wherein for each particular anti-correlator, at least one other of the anti-correlators is associated with a relative delay that is within "x" seconds of the relative delay with which said particular anti-correlator is associated, "x" being substantially the inverse of the highest frequency contained in the first or second sample stream.

* * * * *